United States Patent
Chen et al.

(10) Patent No.: US 9,361,462 B2
(45) Date of Patent: Jun. 7, 2016

(54) ASSOCIATING A SIGNING KEY WITH A SOFTWARE COMPONENT OF A COMPUTING PLATFORM

(75) Inventors: Liqun Chen, Bristol (GB); Mark Ryan, Birmingham (GB); David Plaquin, Bristol (GB); Serdar Cabuk, London (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 1728 days.

(21) Appl. No.: 12/638,726

(22) Filed: Dec. 15, 2009

(65) Prior Publication Data
US 2010/0161998 A1    Jun. 24, 2010

(30) Foreign Application Priority Data

Dec. 15, 2008  (GB) .................................. 0822726.6

(51) Int. Cl.
*G06F 21/57* (2013.01)
(52) U.S. Cl.
CPC ...................................... *G06F 21/57* (2013.01)
(58) Field of Classification Search
CPC combination set(s) only.
See application file for complete search history.

(56) References Cited

U.S. PATENT DOCUMENTS

| 2003/0188179 A1 | 10/2003 | Challener et al. |
| 2005/0138393 A1 | 6/2005 | Challener et al. |
| 2006/0020781 A1 | 1/2006 | Scarlata et al. |
| 2007/0079120 A1 | 4/2007 | Bade et al. |

*Primary Examiner* — Beemnet Dada
(74) *Attorney, Agent, or Firm* — Hewlett Packard Enterprise Patent Department

(57) ABSTRACT

A method and system is provided for operatively associating a signing key with a software component of a computing platform. The computing platform includes a trusted device and on start-up first loads a set of software components with each component being measured prior to loading and a corresponding integrity metric recorded in registers of the trusted device. The system stores a key-related item in secure persistent storage, the key-related item being either the signing key or authorization data for its use. The trusted device is arranged to enable a component of the software-component set to obtain the key-related item, this enabling only occurring when the current register values correspond to values only present prior to loading of components additional to those of the software-component set. Certificate evidence is provided indicating that the signing key is operatively associated with a component of the software-component set.

23 Claims, 9 Drawing Sheets

Figure 11

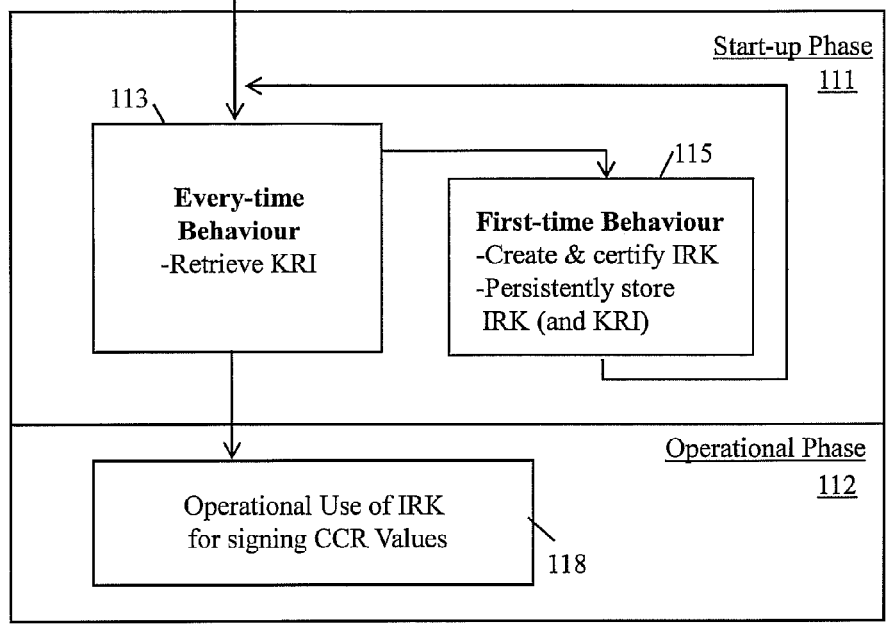

Start-up Phase 111

113 — Every-time Behaviour
-Retrieve KRI

115 — First-time Behaviour
-Create & certify IRK
-Persistently store IRK (and KRI)

Operational Phase 112

Operational Use of IRK for signing CCR Values
118

Figure 12

| OPERATIONAL USE AND PERSISTENT STORAGE (OUPS) SCENARIO | 1 | 2 | 3 | 4 | 5 |
|---|---|---|---|---|---|
| 120 → •SIRC IRK Usage Model | Direct | Direct | Proxy | Proxy | Proxy |
| 121 → •IRK direct user | S | S | T | T | M |
| 122 → •IRK persistent storage | T | M | T | T | M |
| 123 → •Key-Related Item (KRI) provided from trusted persistent storage to SRTM during SIRC proof period | IRK | IRK | authData | authData | authData |
| 124 → •Persistent storage for Key-Related Item | T | M | T | M | T |
| 125 → •Example role of TPM in release of Key-Related Item (KRI) during SIRC proof period | KRI Release | KRI Decrypt | KRI Release | KRI Decrypt | KRI Release |

Every-time Behaviour - OUPS Scenario 1      Figure 13
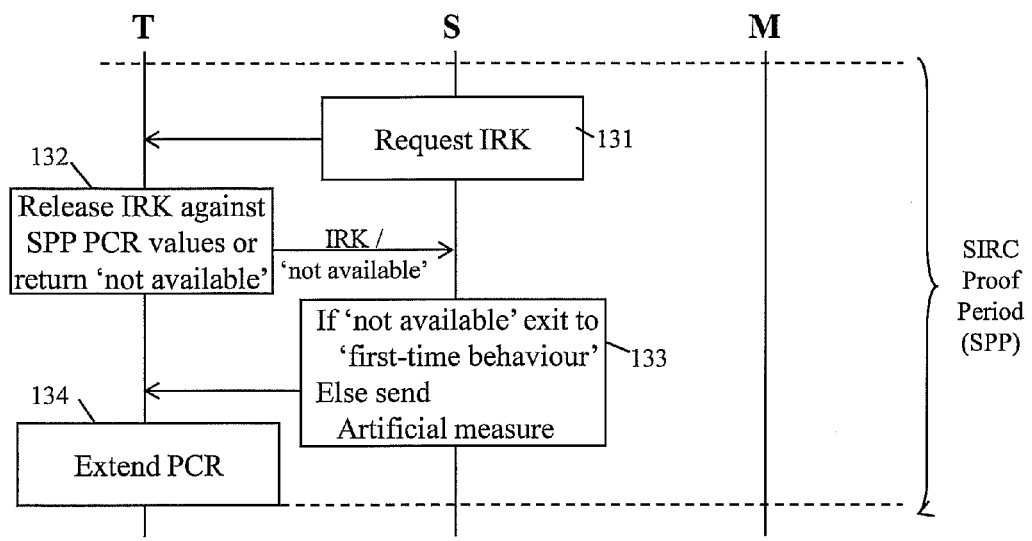
Every-time Behaviour - OUPS Scenario 2      Figure 14
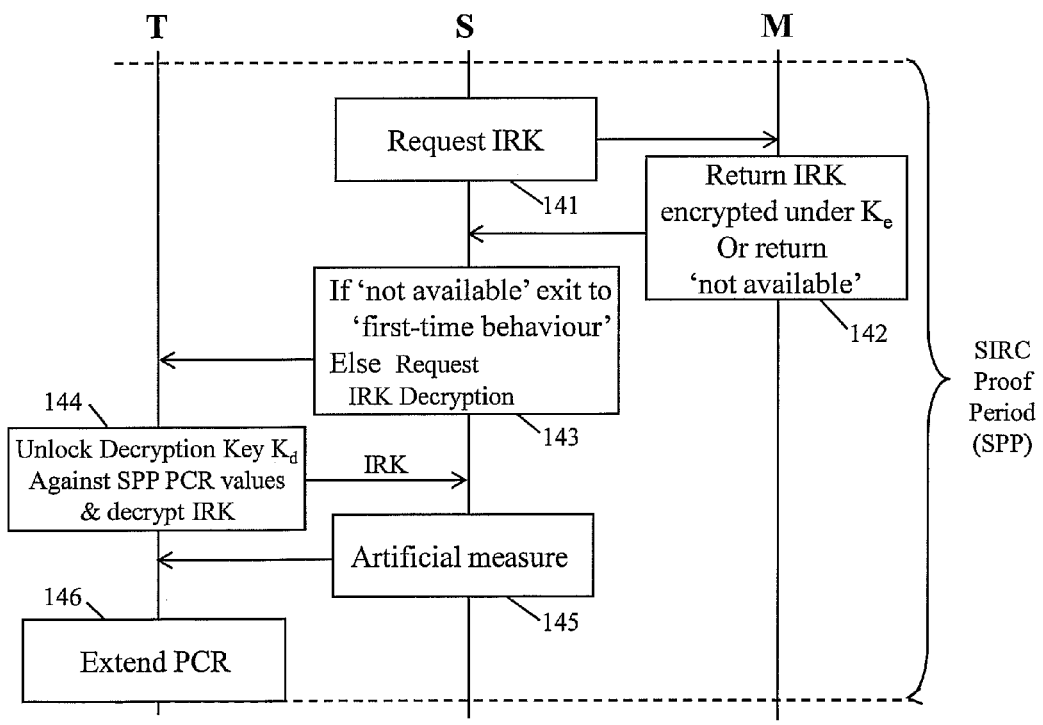

ASSOCIATING A SIGNING KEY WITH A SOFTWARE COMPONENT OF A COMPUTING PLATFORM

FIELD OF INVENTION

This invention relates to a method and system for operatively associating a signing key with a software component of a computing platform.

In the present specification, reference to a signing key is a reference to a public/private asymmetric key pair of which the private key is used to generate a digital signature that can be verified using the public key (the latter generally being certified by a certificate signed by a trusted entity often called a certificate authority). Normal trusted-computing usage is followed below wherein reference to "signing key" can mean the public/private key pair as a whole, or either the private key or public key alone, the context indicating which usage of "signing key" is being employed. Thus, reference to use of the signing key to sign data is a reference to use of the private key whereas a reference to a certificate in respect of the signing key means a certificate in respect of the public key.

BACKGROUND OF INVENTION

The last decade has seen the emergence of trusted computing platforms based on a trusted secure hardware device known as a Trusted Platform Module (TPM). The Trusted Computing Group (TCG) develops specifications in this area, for example the "TCG TPM Specification" Version 1.2, which is published on the TCG website <https://www.trustedcomputinggroup.org/>. A description of trusted computing principles, of a TPM, and of example trusted platforms is given in the Appendix hereto with reference to FIGS. 1 to 8 of the accompanying drawings.

The TCG integrity measurement/reporting solution is based on an integrity measurement chain. The root of the chain is the TPM, which records in internal registers (called platform configuration registers or "PCRs") a number of integrity metrics that are the cryptographic hash values of every component code in the chain. The TPM is arranged to report PCR values to a local or remote user (also called a "verifier") who can then check the integrity of the components of the chain as currently loaded on the computing platform by checking the reported PCR values against know reference values. The PCR-value reports are signed by the TPM to enable the verifier to check, by verifying the signature, that the report comes from the platform's TPM.

The existing TCG usage model was originally intended for single systems with the TPM as the sole repository for integrity measurements and reporting. Recently, virtualization has become an increasingly popular technology to achieve more and more complicated security requirements on computing platforms. In essence, virtualization enables simple consolidation and isolation of multiple virtual platforms on the same computing platform. As a result, virtualization has brought new challenges to integrity measurement. More specifically, an integrity measurement service now needs to retain more information about the state of the platform and keep track of complex trust dependencies between platform components.

Unfortunately, the TCG integrity measurement approach is fundamentally limited by the fact that the TPM contains only a small number of PCRs (typically 16). Hence, it is not feasible to store individual measurements for a large number of virtualized platform components.

Published European patent application EP-A-1980970 discloses a software component providing measurement/reporting support to the TPM functionality. This software component (called the 'base component') is part of the platform trusted computing base and securely stores integrity metrics provided by virtual trusted entities that monitor software components outside of the trusted computing base. When a verifier wishes to check the integrity of the platform, the TPM and base component cooperate to provide a signed report with both the TPM and the base component individually signing elements of the report using respective signing keys.

A problem arises as to how to provide the base component with its signing key in a trustable manner and such that the same key is used each time the computing platform is started.

SUMMARY OF INVENTION

In one aspect, the present invention provides a method of operatively associating a signing key with a software component of a computing platform; the computing platform including a trusted device and being arranged on start-up to first load a predetermined set of software components with each component being measured prior to loading and a corresponding integrity metric recorded in registers of the trusted device; the method comprising:

generating a signing key and certificate evidence, comprising at least one certificate signed by a certificate authority, indicative that the signing key is operatively associated with a component of said set;

storing a key-related item in secure persistent storage, the key-related item being one of said signing key and authorisation data for its use; and using the trusted device to enable a component of said set, herein the "key-associated component", to obtain the key-related item, this enabling only occurring during a particular period of platform start-up when the current register values correspond to values only present prior to loading of software components additional to those of said set.

The signing key is operatively associated with the key-associated component in the sense that the signing key is either directly usable by the key-associated component to sign data because the key-related component obtained by the key-associated component is the signing key itself, or is indirectly usable by the key-associated component to sign data because the key-related component obtained by the key-associated component is authorisation data for using the signing key (in this latter case, the signing key is used on behalf of the key-associated component by a trusted proxy such as the trusted device).

Preferably, the key-associated component is arranged to securely store integrity measures for software components loaded after the aforesaid set of components, and to provide reports of these integrity measures with these reports being signed using the signing key.

The invention also provides a system for operatively associating a signing key with a software component of a computing platform.

BRIEF DESCRIPTION OF THE DRAWINGS

Embodiments of the invention will now be described, by way of non-limiting example, with reference to the accompanying diagrammatic drawings of the prior art and of embodiments of the invention, in which:

FIG. 11 is a diagram illustrating the main behaviours of the FIG. 9 computing platform relating to the generation and use of a signing key IRK by the SIRC software component;

FIG. 12 is a table giving details of five different scenarios for the operational use and persistent storage of the IRK signing key;

FIG. 13 is an interaction diagram illustrating for a first of the FIG. 12 scenarios, an every-time start-up behaviour between the SIRC software component and the TPM for restoring the IRK signing key to the SIRC software component;

FIG. 14 is an interaction diagram illustrating for a second of the FIG. 12 scenarios, an every-time start-up behaviour between the SIRC software component, an external trusted entity and the TPM for restoring the IRK signing key to the SIRC software component;

DETAILED DESCRIPTION OF EMBODIMENTS OF THE INVENTION

Figure 9:
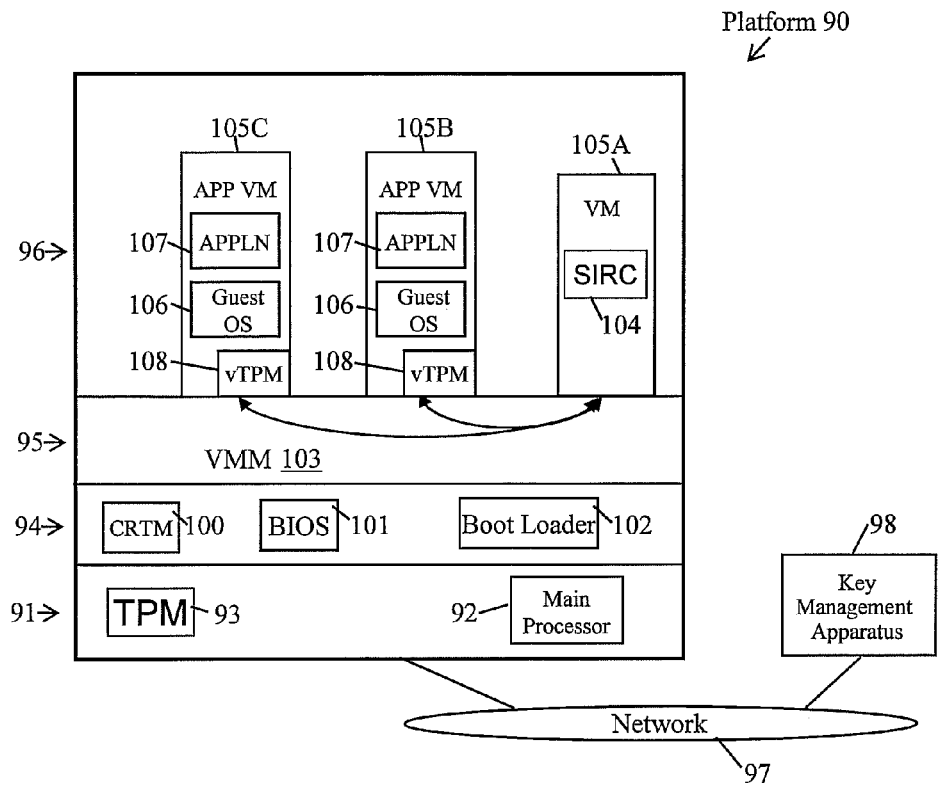
FIG. 9 is a diagram of a system embodying the invention and including a computing platform running multiple virtual machines, the computing platform having both a trusted platform module TPM and a software integrity-reporting component SIRC that form part of the platform's trusted computing base.

FIG. 9 shows a system embodying the invention and comprising a virtualized computing platform 90, key management apparatus 98 formed by a trusted entity separate from the platform 90, and a network 97 providing inter-communication between the platform 90 and the apparatus 98. The network 97 and key management apparatus 98 are only required in some embodiments of the present invention.

The virtualized platform 90 comprises computing hardware 91 running program code that provides the platform functionality shown in FIG. 9, this functionality being conceptually organised into three layers, namely a low-level pre-VMM layer 94 (where VMM stands for 'Virtual Machine Monitor'), a VMM layer 95, and a virtual-machine, VM, layer 96.

The hardware 91 comprises, in addition to a main processor 92 and supporting elements (not shown, such as volatile and non-volatile memory), a Trusted Platform Module, TPM, 93 that is physically or logically bound to the platform motherboard on which the processor 92 is mounted. Associated with the TPM is non-volatile memory containing CRTM code 100 (shown in layer 94 in FIG. 9). The CRTM code 100 provides core root of trust for measurement functionality for obtaining and reporting integrity metrics for platform components. See the Appendix for a general overview of trusted computing and the role of the TPM. It will be assumed for the purposes of the following description that TPM 93 is substantially in compliance with the TCG TPM Specification Version 1.2.

The pre-VMM layer 94 provides boot functionality on platform start-up (including re-booting). The code providing layer 94 comprises, in addition to the CRTM code 100, BIOS code 101 and boot loader code 102. The boot loader code 102 is loaded by the BIOS code 101 and is itself responsible for loading VMM code (such as Xen) providing the virtual machine monitor 103 of layer 95. The VMM 103 is responsible for providing isolated virtual machines 105 and enabling controlled communication between these virtual machines.

In FIG. 9, three virtual machines 105 are shown in the VM layer 96. The first virtual machine 105A is always established on start-up of the platform 90 and is used to run a software integrity-reporting component SIRC 104. In addition to the VM 105A, the layer 96 will generally include application virtual machines the number of which will depend on the operational requirements of the platform 90; in the present case, two application virtual machines 105B and 105C are shown, each running its own guest operating system 106 and application software 107. Each application virtual machine 105B, 105C is also depicted as running a respective virtual TPM (vTPM) 108. In the present embodiment the role of each vTPM 108 is to measure and report to SIRC 104, integrity measures for the code loaded in respect of the same virtual machine; however, it is alternatively possible to arrange for the SIRC 104 to measure and record integrity metrics for the code loaded in respect of each application virtual machine. The SIRC 104 is responsible for storing these measures securely as integrity metrics in software registers called "Component Configuration Registers", CCRs, and for reporting these metrics to a verifier in signed integrity reports. The CCRs thus have a role similar to that of the PCRs of the TPM and are, for example, implemented in normal RAM using a protected storage approach similar to the protected storage implemented for the TPM and described in the Appendix with reference to FIG. 7.

With regard to the measuring and recording of integrity metrics for enabling verification of the trustworthiness or otherwise of software loaded on the platform 90, the platform operates generally as follows (see FIG. 10).

Figure 4:
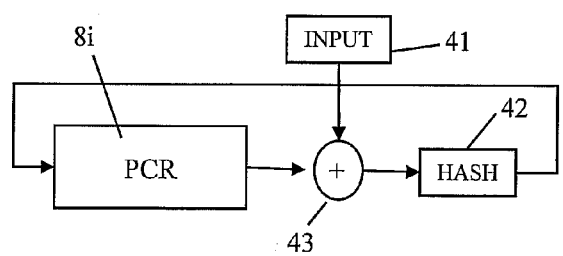
FIG. 4 illustrates the known prior-art process of extending values into a platform configuration register of the trusted device of FIG. 2.
Figure 5:
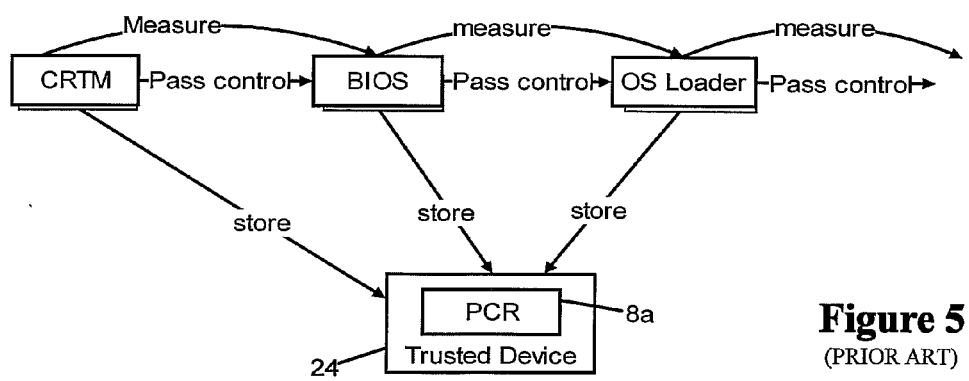
FIG. 5 illustrates the principle of transitive trust in a prior-art trusted computing platform.

On start-up, a chain of trusted components 100 to 104 is first loaded with each component (other than the CRTM 100 which is the first component loaded) being measured before loading by the preceding component and this measure recorded in the PCRs of the TPM (substantially as described in the Appendix with reference to FIGS. 4 and 5). Thus:

CRTM 100, before loading the BIOS 101, measures the BIOS code and records this measure to the TPM PCRs;

BIOS 101, before loading the boot loader 102, measures and records this measure to the TPM PCRs;

boot loader 102, before loading the VMM 103, measures the VMM code and records this measure to the TPM PCRs; and VMM 103, before loading the SIRC, measures the SIRC code and records this measure to the TPM PCRs.

The set of components 100 to 104 together with the TPM 93 substantially make up the trusted computing base (TCB) 99 of the platform 90.

Thereafter, the SIRC 104 measures (either directly or with the aid of the vTPMs 108) the remaining software components loaded on the platform 90 (principally the components of each application VM 105B and 105C) and records these measures in the CCRs 110 of the SIRC 104. Since the SIRC 104 is a piece of software, there is no limitation of the number and construction of CCRs.

When a verifier requests an integrity report in respect, for example, the application virtual machine 105B, this report will need to include both PCR values signed by the TPM to enable the integrity of the loaded components up to and including the SIRC 104 to be checked, and CCR values signed by the SIRC to enable the integrity of the loaded components of application VM 105B to be checked.

The Appendix describes, with reference to FIG. 5, the provision by a TPM to an external verifier of an integrity report (including PCRs values), the report being signed by the TPM using the private element of an Attestation Identity Key AIK of the TPM; the verifier can confirm that a report has been signed by a genuine TPM by checking the signature using a certificate linking the public element of the signing key to a genuine TPM, this certificate being issued by a certificate authority the verifier is willing to trust.

In a similar manner, the SIRC 104 signs its integrity reports (including CCR values) using the private element of an asymmetric signing key, this key being herein referred to as the "Integrity Reporting Key", IRK. Again, a verifier needs to be able to trust that the report is signed by a genuine SIRC, preferably one associated with the TPM of the same platform. As for the TPM's signing key this is achieved through use of a certificate signed by a certificate authority the verifier is willing to trust and certifying that the public key element of the Integrity Reporting Key IRK is operatively associated with a genuine SIRC (and preferably also that the SIRC is associated with a particular TPM).

One major difference between the TPM 93 and the SIRC 104 is that the TPM can securely hold its signing key in a persistent manner (that is, the key is retained even when the platform is not powered) whereas the SIRC, being a software component, cannot do so itself. The SIRC's signing key IRK can, of course, be securely held by the SIRC once established in its VM 105A but the IRK cannot be securely held by the SIRC when the platform is un-powered (although the IRK could be saved in SIRC protected storage held in non-volatile memory, this merely shifts the problem because such storage is only usable for secure storage during a current session unless the master encryption key for this storage can itself be securely and persistently stored).

However, it is obviously highly desirable that the SIRC 104 uses the same IRK over a plurality of sessions of usage of the platform 90; this, of course, requires that the IRK is stored persistently between usage sessions and made operatively available to the SIRC at each re-start of the platform. Below are described a number of ways, each embodying the invention, as to how to create, certify and persistently store the SIRC signing key IRK.

It should be noted that use of the IRK to sign the SIRC's integrity reports can be done either:

by providing the IRK to the SIRC to enable the latter to directly use the IRK to sign its integrity reports; or by providing the SIRC with authorisation data (abbreviated herein to 'authData') for using the IRK, the IRK actually being held and used by another (trusted) entity on behalf of the SIRC upon presentation to it of the authData the trusted entity directly using the IRK effectively acts as a proxy for the SIRC in signing the latter's integrity reports.

Whether use of the IRK by the SIRC is direct or through a proxy, the IRK is said to be 'operatively associated' with the SIRC. In both cases, the SIRC needs to be provided with an item, hereinafter "key-associated item", KRI, that must be persistently stored between usage sessions. Where use of the IRK by the SIRC is direct, the key-associated item KRI is the IRK itself, whereas where use of the IRK by the SIRC is through a proxy, the key-associated item KRI is the authData for using the IRK.

Figure 7:
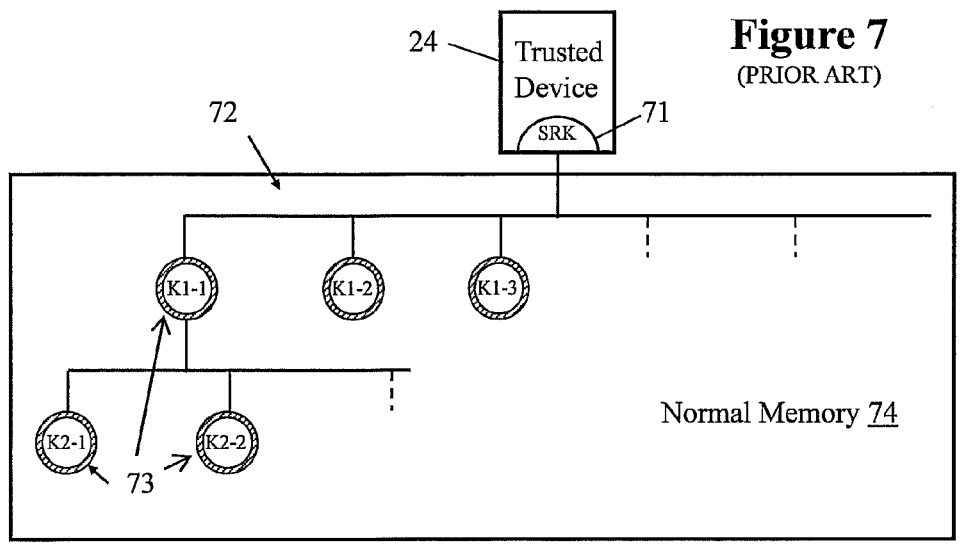
FIG. 7 is a diagram of a key hierarchy associated with a trusted entity.
Figure 10:
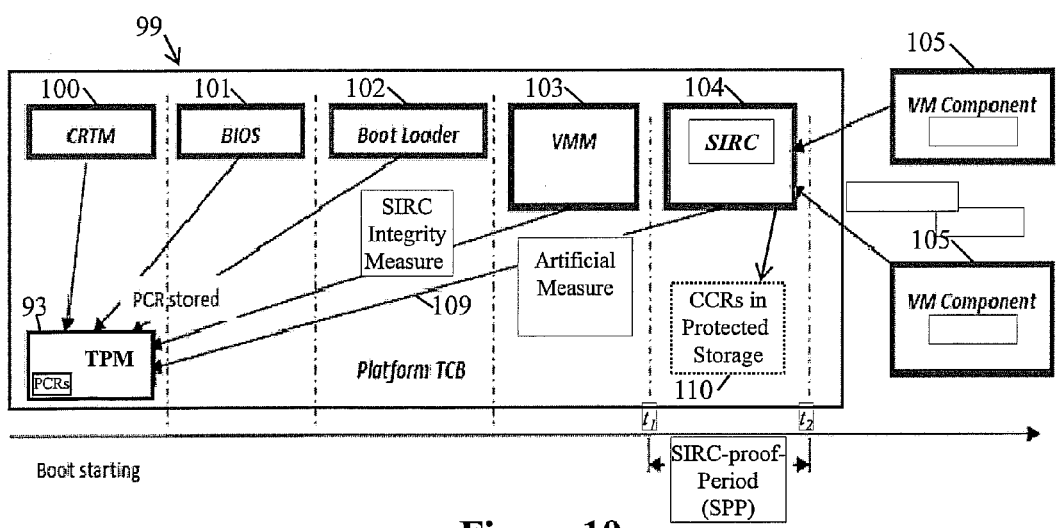
FIG. 10 is a diagram illustrating the recording of integrity metrics in the TPM and the SIRC software component during start-up of the FIG. 9 computing platform.

In general terms, the mechanism used (and trusted by a verifier) for ensuring that the key-related item KRI is only released from persistent storage to the SIRC 104 and not to some other software component, involves the TPM 93 only enabling a software component of the platform to obtain the key-related item KRI during a particular period of platform start-up when the current PCR values correspond to values only present between when the SIRC integrity metric is measured and stored to the PCRs (substantially time $t_1$ in FIG. 10 assuming that the SIRC is measured immediately before loading), and a point in time before any software component additional to the SIRC is loaded (substantially time $t_2$ in FIG. 10). This period $t_1$ $t_2$ is referred below as the 'SIRC-proof-period' (abbreviated to 'SPP') and the PCR values during the SIRC-proof-period are referred to as the 'SPP PCR values'. By ensuring that the SPP PCR values do not continue to exist beyond the SIRC-proof-period, the TPM can determine that it is in the SIRC-proof-period by reference to the current PCR values. In particular, the TPM can lock data (such as a key) in a node of its protected storage hierarchy (c.f. FIG. 7) for release against the SPP PCR values and thereby ensure that the data concerned will only be accessible during the SIRC-proof-period. By arranging for the unlocked data to be the key-related item KRI or to be necessary for release of the KRI, the key-related item is only made available during the SIRC-proof-period. Since the components 100 to 103 loaded before the SIRC 104 are not designed to request the key-related component KRI, it can be trusted that the only component seeking the key-related item during the SIRC-proof-period is the SIRC (any unauthorised modification of the earlier loaded components to request the KRI will be visible to a verifier through the integrity measure made of that component and stored to the PCRs).

As already noted the foregoing mechanism for trustably providing the key-related item to the SIRC depends on ensuring that the SPP PCR values do not continue to be present in the PCRs beyond the SIRC-proof-period. In the present embodiment, since the SIRC is the last to be loaded component of the chain of trust for which integrity metrics are recorded in the PCRs of the TPM, it is necessary for the SIRC to artificially bring about a change of the PCR values after it has obtained the key-related item; the SIRC does this by asking the TPM to extend a PCR with an artificial measure provided by the SIRC (arrow 109 in FIG. 10). Of course, if the SIRC is not the last component of the chain of trust, it will be configured to measure and record to the PCRs an integrity metric for the next component in the trust chain; in this case, it is not necessary for the SIRC to resort to the use of an artificial measure to change the PCR values.

In overview, the process for creating, certifying and persistently storing the SIRC signing key IRK (and authData if required) can be divided into two distinct behaviours of the FIG. 9 system depending on whether or not the key-related item KRI already exists. Thus, with reference to FIG. 11, which depicts a usage session split between a start-up phase 111 and an operational phase 112, the default behaviour initiated at every start-up of platform 90 ('every-time behaviour' 113) first checks for the presence of the key-related item KRI in its persistent store—if the KRI exists, it is retrieved to the SIRC under the control of the TPM mechanism outlined above. If the every-time behaviour 113 finds that no KRI exists, then the first-time behaviour 115 is initiated to create and certify an IRK and to store the IRK and any associated authData to persistent storage (the authData or IRK constituting the key-related item KRI); the every-time behaviour 113 is then re-initiated to enable the SIRC to obtain the KRI. It will be appreciated that the first-time behaviour 115 could be arranged to enable the SIRC to obtain the KRI thereby avoiding the need to re-run the every-time behaviour 113 and permitting some overall simplification through the combining of steps of behaviours 115 and 113. During the operational phase 112, the SIRC uses the KRI to bring about the signing of its integrity reports with the IRK (box 118).

A more detailed description will now be given of the every-time behaviour 113 and the first-time behaviour 115 covering a range of combinations of the possible entities for creating and certifying the IRK and for persistently storing the IRK and, where present, the authData. In this respect,
the IRK (and authData if required) can be created by:
an external trusted third party, here the Key Management apparatus 98 (abbreviated hereinafter simply to "M"), or
by the TPM 93 (abbreviated further hereinafter to "T"), or
by the SIRC 104 (abbreviated further hereinafter to "S").
the IRK can be certified by M or by T;
the key-related item KRI and, if different, the signing key IRK can be securely and persistently stored by T or M.
Reference to persistent storage of the KRI by T is to be understood to mean the KRI being held in protected storage controlled by T. Furthermore, it will be appreciated that, the entity T/M effecting persistent storage of the KRI, does not strictly need to continue to hold the KRI during the time the SIRC is holding it provided the SIRC returns the KRI before ceasing to exist.

The every-time behaviour 113 will now be considered in more detail. Five possible scenarios exist for operational use of the IRK and persistent storage of the KRI (herein 'OUPS' scenarios 1 to 5), these scenarios being distinguished from one another by whether the key-related item KRI is the IRK or authData, and by where the KRI is persistently stored; for convenience it is assumed that where the IRK is not the KRI, it is persistently stored at the proxy user T or M. The FIG. 12 table gives the details of the five OUPS scenarios.

In the FIG. 12 table, line 120 indicates, for each OUPS scenario 1 to 5, the IRK usage model—whether direct use by the SIRC or use on behalf of SIRC by its proxy; as can be seen, scenarios 1 and 2 are direct-use scenarios and scenarios 3-5 are proxy scenarios. Line 121 indicates the direct user of the IRK and line 122 indicates where the IRK is persistently stored between platform usage sessions.

Line 123 identifies, for each OUPS scenario 1 to 5, the key-related item KRI provided to the SIRC during the SIRC-proof-period, and line 124 indicates the persistent storage used for the KRI. Finally, line 125 gives for each scenario an example of the role played by the TPM in enabling the SIRC to obtain the KRI during the SIRC-proof-period; for scenarios 1,3 & 5, the example role of the TPM is release of the KRI during the SIRC-proof-period, whereas for scenarios 2 and 4 the example role of the TPM is release of a decryption key during the SIRC-proof-period.

FIG. 13 depicts the interactions between the entities T, S & M (that is, the TPM 93, SIRC 104 and key management apparatus 98) during execution of a preferred form of the every-time behaviour 113 for the OUPS scenario 1 of FIG. 12 (the key-related item KRI is the IRK which is persistently stored in T). The time period covered by FIG. 13 is the SIRC-proof-period when the current PCR values correspond to the SPP PCR values. In this example, the IRK is persistently stored by T in a node of its protected storage hierarchy and is locked to the SPP PCR values. The every-time behaviour 113 proceeds as follows:
In step 131, S requests the key-related item, here formed by the IRK, from T.
In step 132, if the IRK already exists, T retrieves it from protected storage (this being possible because the current PCR values correspond to the SPP PCR values against which the IRK was locked) and returns the IRK to S; if the IRK does not exist, T returns a 'not available indication to S.
In step 133, if a 'not available' indication has been received from T, S switches from every-time behaviour 113 to first-time behaviour 115 to initiate creation of an IRK; if T returned the IRK to S, then S now sends an artificial measure to T to change the current PCR values from the SPP PCR values.
In step 134, T receives the artificial measure and extends a PCR thereby preventing release of the IRK to any subsequently-requesting software component.
As can be seen, M does not participate in the above and may not even exist for this scenario. The interactions between the entities T & S during execution of every-time behaviour 113 for OUPS scenarios 3 and 5 are similar to the above-described interactions for scenario 1 except that for scenarios 3 and 5 the key-related item KRI is authData for using the IRK rather than the IRK itself.

FIG. 14 depicts the interactions between the entities T, S & M during execution of a preferred form of the every-time behaviour 113 for the OUPS scenario 2 of FIG. 12 (the key-related item KRI is the IRK which is persistently stored in M). The time period covered by FIG. 14 is the SIRC-proof-period when the current PCR values correspond to the SPP PCR values. In this example, T holds a decryption key $K_d$ that complements an encryption key $K_e$ held by M ($K_d$ and $K_e$ may be the same or form an asymmetric key pair); the decryption key $K_d$ is stored by T in a node of its protected storage hierarchy and is locked to the SPP PCR values. The every-time behaviour 113 proceeds as follows:
In step 141, S requests the key-related item, here formed by the IRK, from M.
In step 142, if the IRK already exists, M encrypts it using encryption key $K_e$ and returns the encrypted IRK to S; if the IRK does not exist, M returns a 'not available indication to S.
In step 143, if a 'not available' indication has been received from M, S switches from every-time behaviour 113 to first-time behaviour 115 to initiate creation of an IRK; if M returned the encrypted IRK to S, S sends it to T for decryption.
In step 144, T retrieves the decryption key $K_d$ from protected storage and uses it to decrypt the encrypted IRK (this being possible because the current PCR values correspond to the SPP PCR values to which the decryption key $K_d$ was locked); T then returns the IRK to S.
In step 145, S sends an artificial measure to T to change the current PCR values from the SPP PCR values.

In step 146, T receives the artificial measure and extends a PCR thereby preventing release of the IRK to any subsequently-requesting software component.

The interactions between the entities T, S & M during execution of every-time behaviour 113 for OUPS scenario 4 are similar to the above-described interactions for scenario 2 except that for scenario 4 the key-related item KRI is authData for using the IRK rather than the IRK itself.

Turning now to a more-detailed consideration of the first-time behaviour 115, it will be recalled that this behaviour involves creation of the IRK by T, S or M, certification of the IRK by T or M, and the persistent storage of IRK (and authData if present) in the appropriate persistent storage, there being 5 storage scenarios (the OUPS scenarios). This leads to 30 different possibilities (2×3×5) which can conveniently identified by the triple made up of a first letter for the IRK creation entity, a number for the storage scenario, and a second letter for the IRK certification entity. Thus, "T1T" indicates the case where the IRK is created by T, certified by T and persistently stored by T.

The first-time behaviour interactions between T, S and M are described below for several of the thirty possible cases, the cases selected for description being those that illustrate significant concepts in how the first-time behaviour can be implemented, particularly with respect to certification of the IRK.

In this latter respect, it may be noted that whereas M will generally have the freedom to certify the IRK as it wishes and include any appropriate information in the certificate, when T is doing the certifying then if T is a TPM substantially in compliance with the "TCG TPM Specification, Version 1.2", a number of inherent restrictions complicate the certification process. In particular, there is only a limited pre-defined command set for controlling T, and T can only directly use an AIK to certify the IRK where T has itself generated the IRK as a non-migratable key (it being appreciated that, generally, an AIK needs to be involved in the certification of the IRK by T because such a key has been externally certified and can be trusted by a verifier). How T can be used to certify an IRK that is not a non-migratable key generated by T will be explained below in discussing relevant ones of the thirty possible combination of creation entity, certification entity, and OUPS scenario. It may also be noted that when T directly certifies a key (for example, as a result of a "TPM_CertifyKey" command), it can be requested to include in the certificate any PCR values to which the key is locked in protected storage of T; where T has created the key, the certificate may also include the PCR values at creation.

Figure 15:
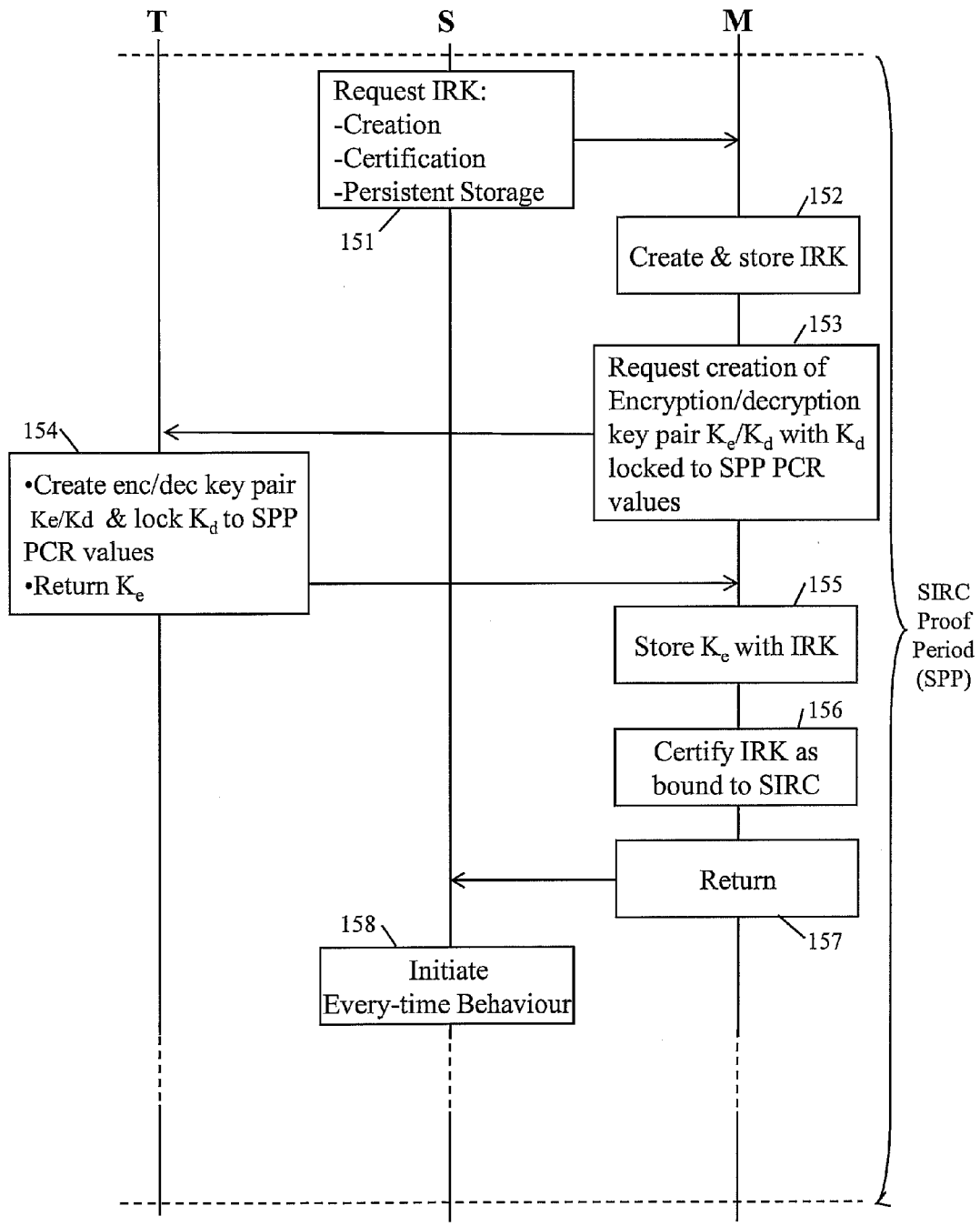
FIG. 15 is an interaction diagram illustrating for a first example case, a first-time start-up behaviour between the SIRC software component, an external trusted entity and the TPM for the creation and certification of the IRK signing key.

Considering first the case "M2M" where the entity M creates, certifies and stores the IRK, FIG. 15 shows the first-time behaviour interactions between T, S and M for this case. The first-time behaviour 115 proceeds as follows:

In step 151, S requests M to create, certify and store a new IRK.

In step 152, M creates and securely stores the new IRK.

In step 153, M requests T create an encryption/decryption key pair ($K_e/K_d$) and store the decryption key $K_d$ locked to specified SPP PCR values. To check that it is talking to a valid TPM, M uses a standard challenge/response protocol with T and verifies the response against T's public key.

In step 154, T creates an encryption/decryption key pair ($K_e/K_d$) and stores the decryption key $K_d$ in its protected storage locked to the SPP PCR values specified by M. T returns the encryption key $K_e$ to M.

In step 155, M stores the encryption key $K_e$ in association with the IRK.

In step 156, M certifies (creates a certificate signed with its private key) that the IRK, represented in the certificate by its public element, is bound to a valid SIRC whereby anything signed using the private element of the IRK can be trusted to have originated with the SIRC. M can be confident in so certifying the IRK because M knows it can trust T (having previously checked that T is a valid TPM) and so can be sure that $K_d$ will be locked to the SPP PCR values whereby the only software component that can obtain the IRK from an encrypted form of IRK (encrypted using $K_e$) is the SIRC.

In step 157, M indicates to S that it has finished.

In step 158, S initiates the every-time behaviour 113.

It is noted that the certificate created in respect of the public element of the IRK will typically be something that the SIRC would supply to a verifier along with a signed integrity report. Accordingly, the certificate will normally be stored with the key-related element KRI for retrieval by the SIRC during execution of the every-time behaviour 113. To this end the first-time behaviour 115 will normally operate to store the certificate with the KRI. Thus for the "M2M" case depicted in FIG. 15, step 156 will also involve storing the certificate with the IRK.

The first-time behaviour interactions between T, S and M for the case "M1M" are in fact simpler than for the "M2M" case with steps 153 and 154 now only involving M securely passing the IRK to T for storage in T's protected storage, locked to the SPP PCR values. Conveniently, the certificate signed by M in respect of the IRK would be created before the IRK is passed to T so that the certificate could be passed to T for storage at the same time as the IRK is passed.

The first-time behaviour interactions between T, S and M for the case "M3M" are similar to the case "M1M" except that now M securely passes the IRK and authData for using the IRK (rather than just the IRK itself) to T for storage in T's protected storage, the IRK being locked to the authData and the authData being locked to the SPP PCR values.

The first-time behaviour interactions between T, S and M for the case "M1T" are also similar to the case "M1M"; however, having T rather than M generate the certificate in respect of the IRK, introduces a complication where T is a TPM substantially in compliance with the "TCG TPM Specification, Version 1.2". This complication is the restriction that T cannot directly use an AIK to certify the IRK because, as previously-mentioned, an AIK can only be used to certify a non-migratable key and not a migratable key or a key created by another entity (as for the "M1T" case). Two approaches to overcoming this complication are:

By setting up a certificate chain from the AIK certificate to the IRK certificate;

To this end, when M passes the IRK to T, it asks T to create a non-migratable signing key (herein '$K_{NMS}$') locked to the SPP PCR values and certified under an AIK of T (the resultant certificate is referred to below as '$C_{NMS}$'). M also asks T to use the non-migratable signing key to sign a certificate in respect of the IRK (this certificate being referred to below as '$C_{IRK}$'). When T creates these certificates, it includes the PCR values to which each key is locked. A verifier can then verify using $C_{NMS}$ that the key $K_{NMS}$ can only be used during the SIRC-proof-period and thus only by a trustable entity—the verifier can therefore trust any certificate signed using $K_{NMS}$. As the verifier can trust $C_{IRK}$, it can trust that the IRK is only obtainable by a software component requesting it during the SIRC-proof-period—that is, by the SIRC component.

By having T create output that can be treated as a certificate.

This is brought about by having M send a TPM_Quote command to T including, as an external input, the IRK public key to be certified and other certificate information. In response to the TPM_Quote command, T will retrieve the current PCR values and sign them, together with the external input, using an AIK. The output produced by T in response to the quote command can thus be used as a certificate on that IRK.

The above approaches to getting T to certify the IRK where the latter is not a non-migratable key created by T, can generally be used in any case where S or M creates the IRK and T is to certify it.

The first-time behaviour interactions between T, S and M for the case "M3T" are similar to the case "M1T" except that now M securely passes both the IRK and authData for using the IRK (rather than just the IRK itself) to T for storage in T's protected storage, the IRK being locked to the authData and the authData being locked to the SPP PCR values.

Figure 16:
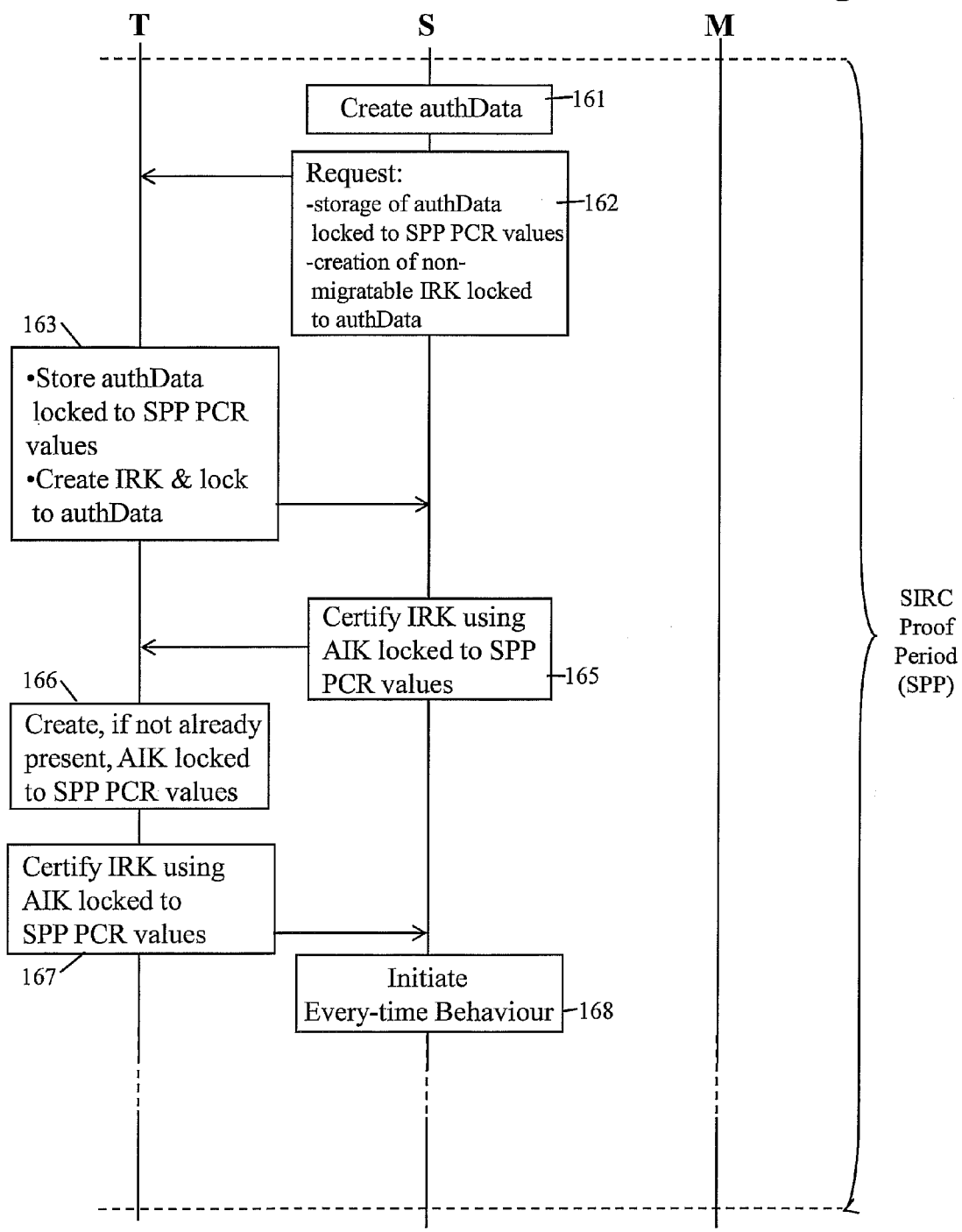
FIG. 16 is an interaction diagram illustrating for a second example case, a first-time start-up behaviour between the SIRC software component, an external trusted entity and the TPM for the creation and certification of the IRK signing key.

FIG. 16 shows the first-time behaviour interactions between T and S for the case "T3T". The first-time behaviour 115 proceeds as follows:
  In step 161, S creates some random authData value.
  In step 162, S requests T to store the authData locked to the SPP PCR values and to create and store a new non-migratable key IRK locked to authData.
  In steps 163, T store the authData against the SPP PCR values and creates and stores a new non-migratable key IRK locked to authData.
  In step 165, S requests T to certify the IRK using an AIK locked to the SPP PCR values.
  In step 166, if such as key does not already exist, T creates an AIK locked to the SPP PCR values.
  In step 167, T certifies the IRK using the AIK that is locked to the SPP PCR values.
  In step 168, S initiates the every-time behaviour 113.

Because the AIK used to certify the IRK is an AIK locked to the SPP PCR values, a verifier knows that the certificate was requested by a trustable entity that has access to the IRK when the current PCR values equal the SPP PCR values—the verifier can safely assumed this component to be the SIRC (because the loaded trustable components are configured to make this so).

The first-time behaviour interactions between T, S and M for the case "T4T" are similar to the case "T3T" except that now the authData is stored by M and a mechanism similar to that described for the "M1M" case is used to ensure that the authData is only obtainable during the SIRC-proof-period (M releases authData encrypted using a key $K_e$ and T stores the corresponding decryption key $K_d$ locked to the SPP PCR values).

The first-time behaviour interactions between T and S for the case "T1T" are similar to the case "T3T" except that the IRK created by T is a migratable key so that mechanism similar to that described for the "M1T" case has to be used to create the IRK certificate.

The first-time behaviour interactions between T, S and M for the case "T3M" are similar to the case "T3T" except that now the IRK is certified by M which it will only do after being assured that the IRK is stored by T locked to the SPP PCR values. T can convince M of this by sending M a copy of the IRK signed by T using an AIK locked to the SPP PCR values.

For the case "S1T", the first-time behaviour interactions between T and S involve S creating the IRK during the SIRC-proof-period and asking T to certify it using the same mechanism as in the "M1T" case.

For the case "S1M", the first-time behaviour interactions between T, S and M involve S creating the IRK during the SIRC-proof-period and asking M to certify it using the same mechanism as in the "T3M" case.

Generally the remaining combination of IRK creation, OUPS scenario, and IRK certification can all be implemented using the mechanisms described above and so will not be described in detail herein.

It may be noted that it will generally be desirable for the IRK to be linked to the TPM of the same computing platform. This link will be automatically present where the TPM (T) is responsible for certifying the IRK. Where the IRK is certified by the key management apparatus 98 (M), then the SIRC 104 (S) can be arranged to pass M the AIK of the associated TPM (for example, after obtaining it from T); M can then interrogate the TPM of the platform running S to confirm that the AIK belongs to that TPM and M can then include this information in its certificate in respect of the IRK.

Although in the foregoing, the trusted computing mechanisms have been described in terms of the architecture and command set employed by the Trusted Computing Group, it is to be understood that the present invention is not limited to this particular implementation of trusted computing principles. It is also to be understood that the present invention is not limited to virtualised platforms providing virtual machines.

The software component to which the signing key is released may have functionality different from that of the SIRC component and the component need not be the last component in the set of trusted component first loaded on platform start-up. The SPP PCR values to which the key-related item PKI is locked need not be the values corresponding to the component to which the signing key is released but could instead be PCR values corresponding to a later loaded component in the set of first-loaded trusted components (for example, the trusted component corresponding to the release PCR values could, upon being loaded, trigger an earlier-loaded component to request the key-related item KRI from its persistent storage).

Appendix-Trusted Computing

This Appendix forms an integral part of the present specification. In the present context "trust" is the expectation that a device will behave in a particular manner for a specific purpose, and. a "user" can be a local user or a remote user such as a remote computing entity.

A significant consideration in interaction between computing entities is trust—whether a foreign computing entity will behave in a reliable and predictable manner, or will be (or already is) subject to subversion. Trusted systems which contain a component at least logically protected from subversion have been developed by the companies forming the Trusted Computing Group (TCG). The TCG develops specifications in this area, for example the "TCG TPM Specification" Version 1.2, which is published on the TCG website <https://www.trustedcomputinggroup.org/>. The implicitly trusted components of a trusted system enable measurements of a trusted system and are then able to provide these in the form of integrity metrics to appropriate entities wishing to interact with the trusted system. The receiving entities are then able to determine from the consistency of the measured integrity metrics with known or expected values that the trusted system is operating as expected.

An overview of the main features of a trusted platform is given below followed by a description, with reference to FIGS. 1 to 8, of two example prior-art trusted computing platforms. The specifics of the described prior-art trusted computing platforms are not intended to limit the scope of the present invention unless otherwise stated.

General Characteristics of a Prior-Art Trusted Platform

A trusted computing platform provides for trustable platform integrity measurement and reporting. and to this end has a plurality of shielded locations, that is, places (memory, registers, etc.) where it is safe to operate on sensitive data. Integrity measurement is the process of obtaining integrity metric measurements of a platform (that is, measurements of platform characteristics that affect the integrity—trustworthiness—of the platform) and putting the measurements (here taken to encompass derivative values such as digests) into shielded locations; in TCG parlance, the shielded locations used for storing integrity metrics are referred to as Platform Configuration Registers or "PCRs" and this terminology will be used hereinafter. The values held in the PCRs are reportable integrity metric values. Integrity reporting is the process of attesting to integrity metrics recorded in PCRs in a way that associates the metrics with the platform concerned. A trusted computing platform may also provide, in addition to shielded locations, trustable storage for securely storing data in encrypted form and for ensuring that access to this data only occurs in a named environment. The foregoing trusted features will normally involve the use of cryptographic functions.

A user can verify the correct operation of a trusted computing platform, for example, before exchanging data with the platform, by requesting the trusted platform to provide one or more integrity metrics. The user receives the integrity metric or metrics, and compares them against values which it believes to be true (these values being provided by a trusted party, TP that is prepared to vouch for the trustworthiness of the platform or by another party the user is willing to trust). If there is a match, the implication is that at least part of the platform is operating correctly, depending on the scope of the integrity metric. If there is no match, the assumption is that the entire platform has been subverted and cannot be trusted (unless isolation technologies are employed to restrict the scope of what cannot be trusted).

Once a user has established trusted operation of the platform, he exchanges data with the platform. For a local user, the exchange might be by interacting with some software application running on the platform. For a remote user, the exchange might involve a secure transaction. In either case, the data exchanged is preferably 'signed' by the trusted platform. The user can then have greater confidence that data is being exchanged with a platform whose behaviour can be trusted. Data exchanged may be information relating to some or all of the software running on the computer platform.

Trusted Entity Providing for Roots of Trust

In order to impart to a computing platform the characteristics of a trusted computing platform, it is necessary to provide the platform with certain inherently trustable functionalities (collectively making up what is herein referred to as a "trusted entity") which are is physically or logically bound to the platform and operate, together with elements of the computing platform, to provide the desired trusted characteristics (minimally, integrity measurement and reporting). In effect, the trusted entity provides the platform with 'roots of trust' and an example of this is given below.

For trusted platforms following the TCG Specifications, the trusted entity is called a Trusted Platform Module ("TPM") and serves to provide, together with elements of the computing platform to which the trusted entity is bound, the following "roots of trust":

A root of trust for measurement (RTM),—the RTM is a computing engine capable of making inherently reliable integrity measurements and is typically the normal platform computing engine (main processor) controlled by the so-called core root of trust for measurement (CRTM), that is the instructions executed by the platform when it acts as the RTM. The CRTM is logically part of the aforesaid trusted entity and would ideally be included in the TPM but for cost reasons is usually implemented by a separate ROM.

A root of trust for storage (RTS)—the RTS is a computing engine capable of maintaining an accurate summary in PCRs of values of integrity measurement digests; the RTS may also provide for 'protected storage' serving to protect data (frequently keys) held in external storage devices as opaque "blobs" with access to a blob's data being controlled by the RTS against specified access-control conditions such as proof of knowledge of a secret and/or the existence of a particular environment (as indicated by PCR values).

A root of trust for reporting (RTR)—the RTR is a computing engine responsible for establishing platform identities, reporting platform configurations (PCR values), protecting reported values and establishing a context for attesting to reported values. The RTR shares responsibility of protecting measurement digests with the RTS.

It may be noted that, as indicated above, the elements forming the RTM are typically (though not necessarily) outside a TPM; in contrast, the RTS and RTR are normally provided by the TPM itself.

Generally, any trusted platform will provide such roots of trust (though possibly in a different conceptual arrangement).

A trusted entity can be embodied as a hardware device (which may include a program-controlled processor) or in software for execution by a main processor of the platform (in which case it is usually referred to as a 'virtual' trusted entity/device or in the case of a TPM, a virtual TPM). In practice, virtual trusted entities are normally provided on platforms that have a basic hardware trusted entity for the basic platform environment but which employ further trusted entities for virtual environments created on the platform. A hardware trusted entity is usually physically bound to the platform with which it is associated whereas a software trusted entity is logically bound to the platform with which it is associated.

It is, of course, also possible to implement a trusted entity as a combination of hardware device and software intended for execution on the platform; where the trustworthiness of the software can be established by a chain of trust rooted in the RTM.

The functionality of the trusted entity can be distributed between multiple devices (in the case of a hardware embodiment) or code blocks (in the case of a 'virtual' embodiment).

The trusted entity uses cryptographic processes but does not necessarily provide an external interface to those cryptographic processes. The trusted entity should be logically protected from other entities—including other parts of the platform of which it is itself a part. Also, most desirable implementations provide the trusted entity with protective features to protect secrets stored by or being processed by the trusted entity by making them inaccessible to other platform functions, and provide an environment that is substantially immune to unauthorised modification.

For a hardware embodiment, the trusted entity, therefore, preferably consists of one physical component that is tamper-resistant. Techniques relevant to tamper-resistance are well known to those skilled in the art of security. These techniques include methods for resisting tampering (such as appropriate encapsulation of the trusted entity), methods for detecting tampering (such as detection of out of specification voltages, X-rays, or loss of physical integrity in the trusted entity casing), and methods for eliminating data when tampering is evident. As regards a 'virtual' trusted entity, although software may not afford such a high degree of tamper-resistance as a hardware device, this may be compensated for by additional protection measures. For example, the software code may include self-test functions, to check the integrity of the trusted functionality.

Chain of Trust—The trustable integrity measurement and reporting enabled by the presence of the trusted entity in the platform typically enables trust to be placed in other platform components or functions which in turn perform trustable integrity measurement of further platform components or functions and so on. This process of extending the boundary of what is trustable is called "transitive trust" and can be thought of as establishing a chain of trust rooted in the platform's roots of trust. Thus in a typical example:

the trusted code for effecting an initial integrity measurement (the CRTM in TCG parlance) serves to measure an integrity metric of OS loader code to enable trust to be placed in this code (if the metric match the expected value);

the OS loader code in turn determines an integrity metric for Operating System code to enable trust to be placed in the operating system;

the operating system in turn determines an integrity metric for application code to enable trust to be placed in the application.

First Example Prior-Art Trusted Platform—Overview

Figure 1:
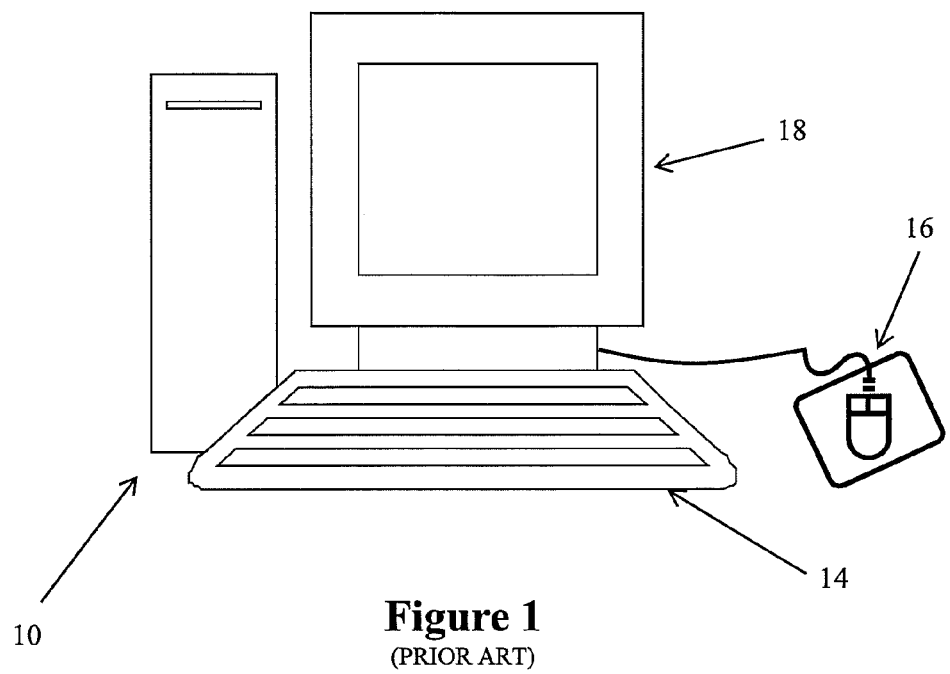
FIG. 1 is an illustration of an exemplary prior-art computing platform.

An example trusted platform 10 is illustrated in the diagram in FIG. 1. The computing platform 10 is shown as a so-called personal computer and is entirely conventional in appearance—it has associated the standard features of a keyboard 14, mouse 16 and visual display unit (VDU) 18, which provide the physical 'user interface' of the platform. The computing platform 10 is arranged to run a standard operating system such as Microsoft™ Windows XP™.

Figure 2:
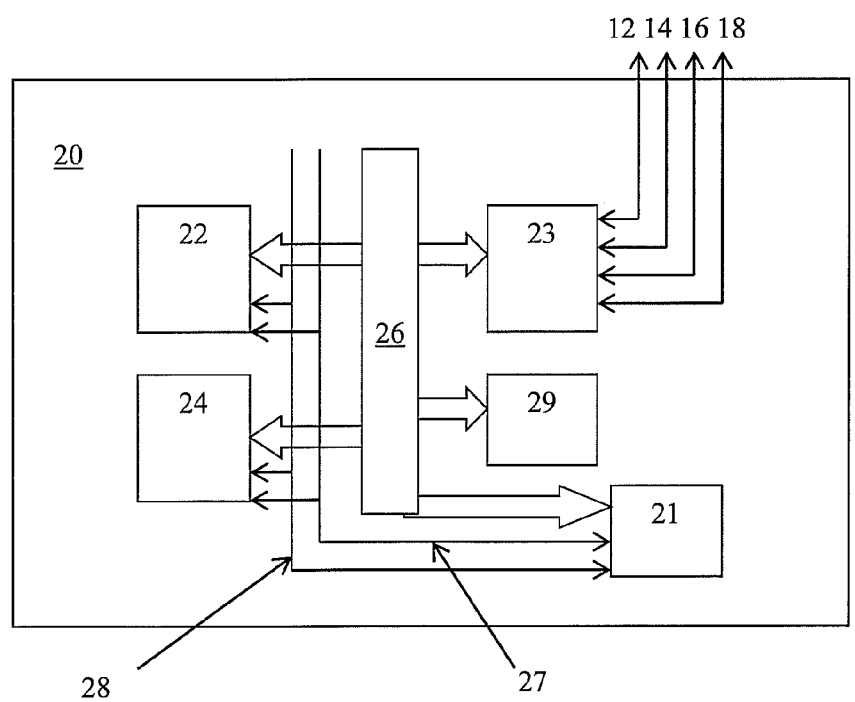
FIG. 2 indicates functional elements present on the motherboard of a prior-art trusted computing platform.

As illustrated in FIG. 2, the motherboard 20 of the trusted computing platform 10 includes (among other standard components) a main processor 21, main memory 22, a trusted entity here embodied in the form of trusted device 24 (such as a hardware TPM), a data bus 26 and respective control lines 27 and address lines 28, BIOS memory 29 containing the BIOS program for the platform 10, an Input/Output (IO) device 23, which controls interaction between the components of the motherboard and the keyboard 14, the mouse 16 and the VDU 18, and an I/O device 25, for example an Ethernet controller, for controlling communications with remote devices or systems. The main system memory 22 is typically random access memory (RAM). In operation, the platform 10 loads the operating system, in this case Windows XP™, into RAM from hard disk (not shown). Additionally, in operation, the platform 10 loads the processes or applications that may be executed by the platform 10 into RAM from hard disk (not shown). The mounting of the trusted device 24 on the mother board serves to bind it to the platform.

Typically, in a personal computer, the BIOS program is located in a special reserved memory area, such as the upper 64K of the first megabyte of the system memory (addresses F000h to FFFFh), and the main processor is arranged to look at this memory location first, in accordance with an industry wide standard. A significant difference between the trusted platform under discussion and a conventional platform is that, after reset, the main processor is initially controlled by CRTM code (which in the present example comprise hash function code stored in the trusted device 24) which then hands control over to the platform-specific BIOS program, which in turn initialises all input/output devices as normal. After the BIOS program has executed, control is handed over as normal by the BIOS program to an operating system program, such as Windows XP™, which is typically loaded into main memory 22 from a hard disk drive (not shown).

The main processor 21 is initially controlled by the CRTM code because it is necessary to place trust in the first measurement to be carried out on the trusted platform. The CRTM code is typically trusted at least in part because its provenance. As already indicated, the main processor 21 when under control of the CRTM forms the "root of trust for measurement" RTM. As is typical, one role of the RTM in the present case is to measure other measuring agents before these measuring agents are used and their measurements relied upon. The RTM is the basis for the aforementioned 'chain of trust'. Note that the RTM and subsequent measurement agents do not need to verify subsequent measurement agents; they merely measure and record them before they execute. This is called an "authenticated boot process". Valid measurement agents may be recognised by comparing a digest of a measurement agent against a list of digests of valid measurement agents. Unlisted measurement agents will not be recognised, and measurements made by them and subsequent measurement agents are deemed to be suspect.

Example Trusted Device

Further details will now be given of an implementation of the trusted device 24, it being understood that corresponding functionality can be provided in a software trusted entity (that is, virtual trusted device).

Figure 3:
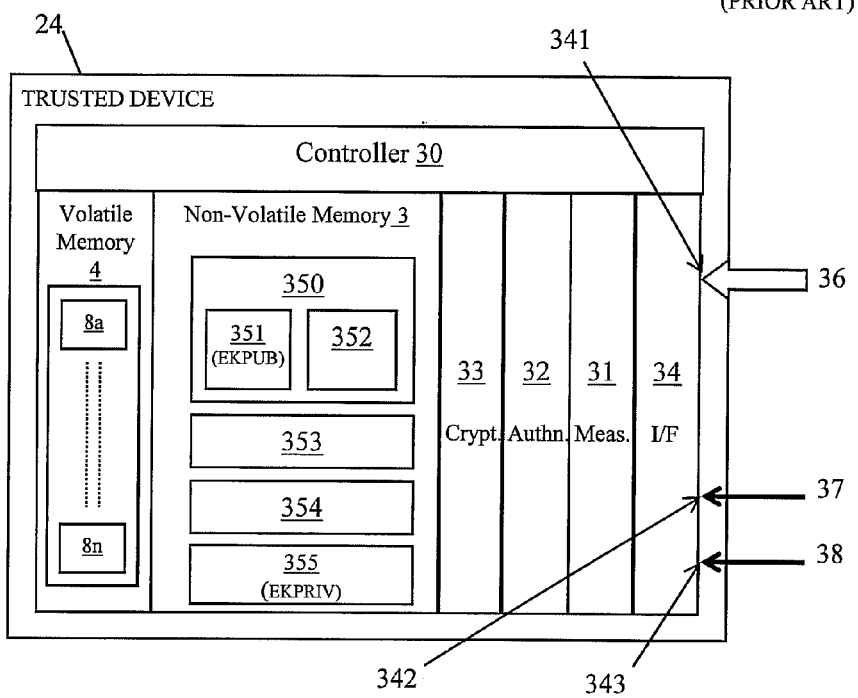
FIG. 3 indicates the functional elements of a prior-art trusted device of the trusted computing platform of FIG. 2.

The trusted device 24 comprises a number of blocks, as illustrated in FIG. 3. As already indicated, after system reset the trusted device 24 participates in an authenticated boot process to ensure that the operating state of the platform 10 is recorded in a secure manner. During the authenticated boot process, the trusted device 24 acquires at least one integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface; in a particularly preferred arrangement, the display driver for the computing platform is located within the trusted device 24 with the result that a local user can trust the display of data provided by the trusted device 24 to the display—this is further described in the applicant's International Patent Application No. PCT/GB00/02005, entitled "System for Providing a Trustworthy User Interface" and filed on 25 May 2000, the contents of which are incorporated by reference herein.

Specifically, the trusted device 24 in the present embodiment comprises: a controller 30 programmed to control the overall operation of the trusted device 24, and interact with the other functions on the trusted device 24 and with the other devices on the motherboard 20; a measurement function 31 for acquiring a first integrity metric from the platform 10 either via direct measurement or alternatively indirectly via executable instructions to be executed on the platform's main processor; a cryptographic function 32 for signing, encrypting/decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. As has already been described, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

The non-volatile memory 3 of the trusted device 24 stores a private key 355 (PRIVEK) of an Endorsement key (EK) pair specific to the trusted device 24; preferably, the non-volatile memory 3 also stores a certificate 350 containing at least the public key 351 (PUBEK) of the Endorsement key pair of the trusted device 24 and an authenticated value 352 of at least one platform integrity metric measured by a trusted party (TP). The certificate 350 is signed by the TP using the TP's private key prior to it being stored in the trusted device 24. In later communications sessions, a user of the platform 10 can deduce that the public key belongs to a trusted device by verifying the TP's signature on the certificate. Also, a user of the platform 10 can verify the integrity of the platform 10 by comparing one or more acquired integrity metric(s) with the authentic integrity metric value(s) 352. If there is a match, the user can be confident that the platform 10 has not been subverted. Knowledge of the TP's generally-available public key enables simple verification of the certificate 350. The non-volatile memory 35 may also contain an identity (ID) label 353. The ID label 353 is a conventional ID label, for example a serial number, that is unique within some context. The ID label 353 is generally used for indexing and labeling of data relevant to the trusted device 24, but is insufficient in itself to prove the identity of the platform 10 under trusted conditions.

As already indicated, the trusted device 24 cooperates with other elements of the platform 10 to reliably acquire at least one integrity metric of the platform. In the present embodiment, a first integrity metric is acquired by having the main platform processor execute the CRTM code 354 that is stored in the non-volatile memory 3 trusted device 24; the CRTM when executed by the platform processor generates a digest of the BIOS instructions in the BIOS memory and passes it to the measurement function for storage. Such an acquired integrity metric, if verified as described above, gives a potential user of the platform 10 a high level of confidence that the platform 10 has not been subverted at a hardware, or BIOS program, level.

It would alternatively be possible to provide a measurement engine within the trusted device and have this engine form an integrity measurement on the BIOS code on platform start up (reset).

In the present example, the measurement function 31 has access to the non-volatile memory 3 (for accessing the CRTM hash code 354) and volatile memory 4 (for storing acquired integrity metric measurements). The trusted device 24 has limited memory, yet it may be desirable to store information relating to a large number of integrity metric measurements. This is done in trusted computing platforms as described by the Trusted Computing Group by the use of Platform Configuration Registers (PCRs) 8a-8n. The trusted device 24 has a number of PCRs of fixed size (the same size as a standard measurement digest)—on initialisation of the platform, these are set to a fixed initial value. Integrity measurements are then "extended" into PCRs by a process shown in FIG. 4. The PCR 8i value is concatenated 43 with the input 41 which is the value of the integrity measurement to be extended into the PCR. The concatenation is then hashed 42 to form a new 160 bit value. This hash is fed back into the PCR to form the new value of the integrity metric concerned. In addition to the extension of the integrity measurement into the PCR, to provide a clear history of measurements carried out the measurement process may also be recorded in a conventional log file (which may be simply in main memory of the computer platform). For trust purposes, however, it is the PCR value that will be relied on and not the software log.

Clearly, there are a number of different ways in which an initial integrity metric value may be calculated, depending upon the scope of the trust required. The measurement of the BIOS program's integrity provides a fundamental check on the integrity of a platform's underlying processing environment. The integrity metric measurement should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

It may also be noted that, preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked. Optionally, after receiving the computed BIOS digest, the trusted device 24 may inspect the proper value of the BIOS digest in the certificate and not pass control to the BIOS if the computed digest does not match the proper value—an appropriate exception handling routine may be invoked.

Once the BIOS code has been measured by the CRTM), the integrity metric measurement stored to a PCR, and the BIOS loaded, the BIOS preferably measures the next software component (such as OS loader) and causes a corresponding integrity metric measurement to be stored in the trusted device 24 before loading that software, and so on (see FIG. 5); in this way, a chain of trust ('transitive trust') can be built up to include the operating system and applications loaded by it, with corresponding integrity metrics being stored in the PCRs of the trusted device 24.

Other integrity checks may be carried out involving the measuring of program code and storing of a corresponding integrity metric measurement in the trusted device; for example, the CRTM or BIOS could be arranged to measure the BIOS programs associated with a SCSI controller to enable communications with peripheral equipment to be trusted. Other forms of integrity check may also be effected, for example memory devices or co-processors, on the platform could be verified by enacting fixed challenge/response interactions to ensure consistent results; these checks can also give rise to integrity metrics stored in the PCRs of the trusted device 24.

As will be clear from the foregoing, a large number of integrity measurement may be collected by measuring agents directly or indirectly measured by the RTM, and these integrity measurement extended into the PCRs of the trusted device 24. Some—many—of these integrity measurement will relate to the software state of the trusted platform. How the PCRs are allocated is preferably standardized for each platform type. By way of example, according to the TCG Specification for PC Clients, the PCRs are divided into two primary sets: the first set is designated for the platform's pre-OS environment (PCR[0-7]) and the other designated for the platform's OS (PCR[8-15]). In this case, the pre-OS PCRs provide the platform's initial chain of trust starting from platform reset; in other words, they establish a chain of trust from the CRTM through the OS's IPL (Initial Program Load) Code.

Changes to a software component after its initial measurement and loading result in the software component being re-measured and the resulting integrity measurement being passed to the trusted device to extend the PCR associated with that component.

Figure 6:
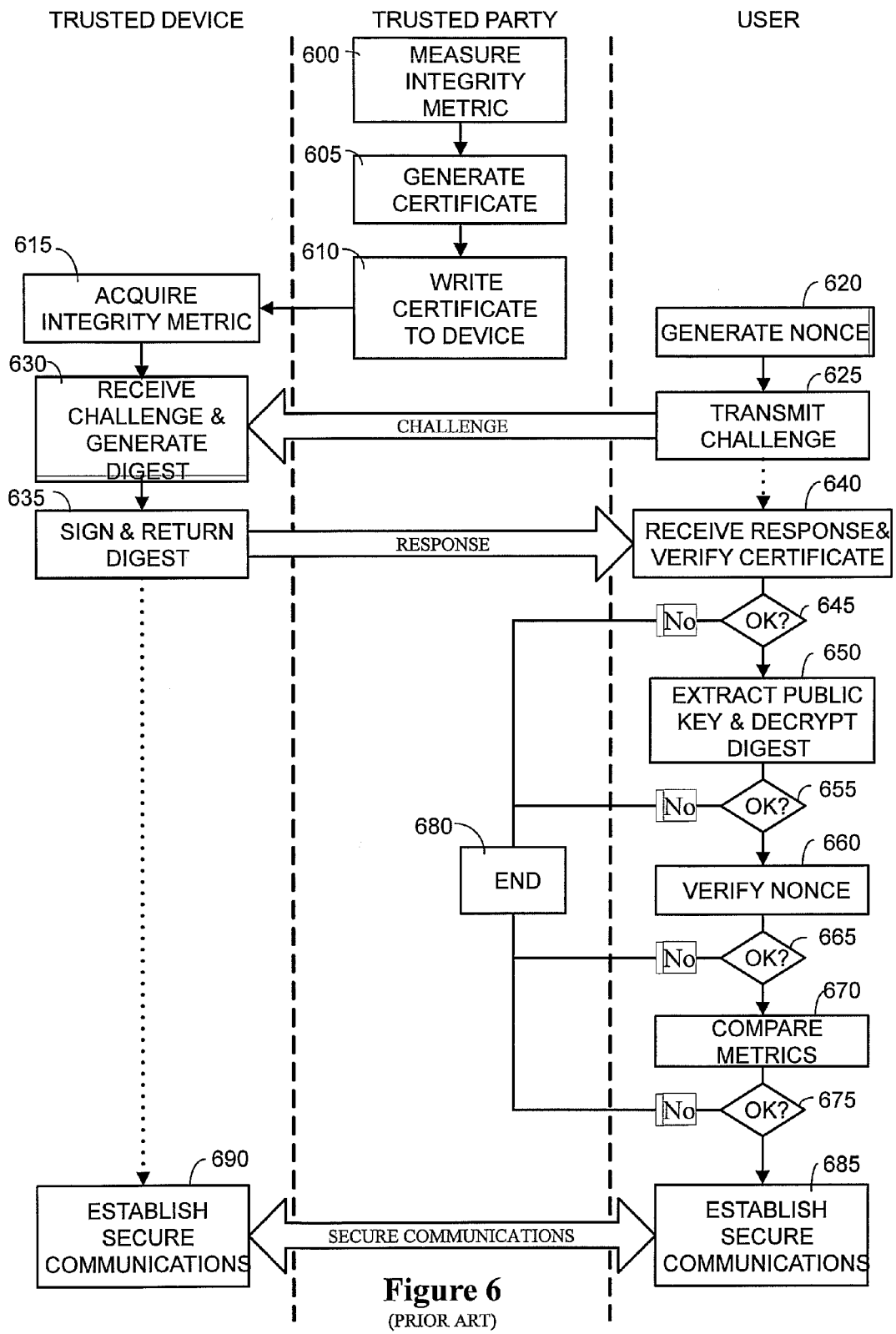
FIG. 6 illustrates a prior-art attestation protocol by which a trusted platform can demonstrate its integrity to another entity.

As already indicated, when a user wishes to communicate with the platform, he uses a challenge/response routine to challenge the trusted device 24 (the operating system of the platform, or an appropriate software application, is arranged to recognise the challenge and pass it to the trusted device 24, typically via a BIOS-type call, in an appropriate fashion). The trusted device 24 receives the challenge and creates an appropriate response based on the measured integrity metric or metrics—this may be provided with the certificate(s) giving expected integrity-metric value(s) and signed. This provides sufficient information to allow verification by the user. FIG. 6 illustrates in more detail the overall process by which a user (for example, of a remote platform) can verify the integrity of the trusted platform incorporating the trusted device 24.

As a preliminary step a trusted party TP, which vouches for trusted platforms, will have inspected the type of the platform to decide whether to vouch for it or not. This will be a matter of policy. If all is well, in step 600, the TP measures the value of integrity metric 352 of the platform. Then, the TP generates certificate 350, in step 605, for the platform. The certificate is generated by the TP by appending the trusted device's public key (EKPUB), and optionally its ID label, to the measured integrity metric, and signing the string with the TP's private key.

In step 610, the trusted device 14 is initialised by writing the certificate 30 into the appropriate non-volatile memory locations of the trusted device 24. This is done, preferably, by secure communication with the trusted device 14 after it is installed in the motherboard 10. The secure communications is supported by a 'master key', known only to the TP, that is written to the trusted device during manufacture, and used to enable the writing of data to the trusted device 24; writing of data to the trusted device 14 without knowledge of the master key is not possible.

At some later point during operation of the platform, for example when it is switched on or reset, in step 615, the trusted device 24 acquires and stores one or more integrity metrics of the platform in its PCRs.

When a user wishes to communicate with the platform, in step 620, he creates a nonce, such as a random number, and, in step 625, challenges the trusted device 24. The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 24 receives the challenge and creates a concatenation of one, some or all of the measured integrity metrics (PCR values), the nonce, and optionally its ID label. Then, in step 635, the trusted device 24 signs the concatenation, using its private key EK, and returns the signed concatenation, accompanied by the certificate, to the user.

In step 640, the user receives the challenge response and verifies the certificate using the well known public key of the TP. The user then, in step 650, extracts the trusted device's 24 public key from the certificate and uses it to decrypt the signed concatenation from the challenge response. Then, in step 660, the user verifies the nonce inside the challenge response. Next, in step 670, the user compares the reported PCR values, which it extracts from the challenge response, with the authentic platform integrity metric value(s), which it extracts from the certificate. If any of the foregoing verification steps fails, in steps 645, 655, 665 or 675, the whole process ends in step 680 with no further communications taking place. It will be appreciated that authentic values for the PCRs can be obtained by the challenger in any suitable manner (for example, direct from a trusted party) and it is not necessary that these authentic values be provided through a certificate stored in the trusted device 24.

Assuming all is well, in steps 685 and 690, the user and the trusted platform use other protocols to set up secure communications for other data, where the data from the platform is preferably signed by the trusted device 24.

Steps 620 to 675 constitute an attestation protocol (the procedure by which the a challenger can validate a platform based on PCR values signed by the trusted device 24). In fact, the attestation protocol is usually (though not necessarily) enhanced in at least two areas:

Firstly, rather than the trusted device 24 using its private Endorsement Key PRIVEK in step 635, it uses a short term private key that is part of a so-called Attestation Identity Key (AIK) pair; the reason for this is that, if only the EK is employed, it can be used to link transactions involving the trusted device 24 which is usually undesirable from a privacy viewpoint. The trusted device 24 is therefore preferably arranged to generate a succession of AIKs each of which is vouched for by a trusted party as belonging to a valid trusted device (the trusted party vouches for the AIK by providing a signed certificate for the public part of the AIK). It may be noted that a trusted device in the form of a TPM does not use its Endorsement Key for signing but uses AIKs for anonymity. Other mechanisms (such as 'Direct Anonymous Attestation') can alternatively be used to provide trusted device anonymity.

Secondly, the trusted device 24 reports not only one or more PCR values, but also a log of the measurements taken. This log (referred to as the Stored Measurement Log, SML) is created by the trusted device 24 to record in full the integrity measurements made, in the order they are made; this gives a much greater visibility as to what software has been loaded onto the platform than is provided by the PCR values which are digests of these measurements. The SML occupies a lot more memory than the PCR values and is therefore not stored in the trusted device 24; however, secure storage of the SML is not required. The challenger, on receiving the SML can check the measurement values it contains with authentic values for the software concerned (these authentic values being obtained in any suitable manner); assuming the measurement values check out, they can then be used to compute expected values for the reported PCRs. The expected and reported PCR values are then compared and if they match then the platform state is validated. Use of the SML not only provides greater transparency but also greater efficiency since the number of authentic measurement values needed in any given environment (for example one for each software module loadable) is significantly less than the potential number of PCR values that could result (as latter number depends not only on the possible number of combinations of software modules loaded, but also on their order of loading).

Protected Storage

As indicated above, a trusted entity such as the trusted device 24 may include trusted functionality (RTS) that provides a 'protected storage' mechanism for locking away data, typically keys or passwords, into an opaque blob held outside the trusted entity, the blob being subsequently unlocked (made accessible beyond the RTS) by the RTS only under specific access conditions such as proof of knowledge of a particular secret and/or when the platform is in a particular (trusted) state as specified at the time of locking the blob by a digest of the values of some or all the PCRs. In this latter case, to unlock the data blob, the same digest must be formed from the current values of the PCRs; if the new digest is not the same as the digest in the opaque blob, then the data cannot be unlocked.

One approach to implementing protected storage in the trusted device 24 will now be described, this approach being that used in TPMs. As illustrated in FIG. 7, in this approach, protected storage is implemented as a hierarchy (tree) 72 of data objects the root of which is a Storage Root Key (SRK) 71 that is permanently stored in the trusted device 24 (and not released from it). Apart from the SRK, the tree 72 can be stored outside of the trusted device in normal memory 74. When data in a node is used or revealed, the node is manipulated by the trusted device. Each intermediate node object in the tree is encrypted by a key in the node object above it in the tree (the parent node), all the way back to the SRK root node; in FIG. 7 two levels are shown below the SRK, namely a first level storing keys K1-1 to K1-3 and a second level storing keys K2-1 and K2-2, the encrypted nature of each key being indicated by the surrounding hatched annulus). Intermediate nodes in the tree will always be keys but leaf nodes can be arbitrary data (though frequently they will also be keys, such as symmetric keys for use by application processes in protecting bulk data). Access conditions can be specified for each node, such conditions comprising one or more of the following:

proof of knowledge of particular authorisation data ('authData') by access-requesting entity (done through use of a protocol that does not reveal the authData);

the existence of a particular operating environment as determined by a comparison of a current digest of one or more PCR values against a specified digest value;

the 'locality' of the access-requesting entity.

The access conditions applicable to a node are stored in the node. The terminology used herein to indicate that a data blob (node) is locked so as only to be usable when particular access conditions (authData/PCR values/locality) are present is to say that the data blob (node) is 'locked to' those particular access conditions.

Keys in the tree can either be "non-migratable" meaning that the private key is only known to and usable by the trusted device, or "migratable" meaning that there is no guarantee about the origin and use of the private key.

Second Example Prior-Art Trusted Platform

Assuming that integrity metrics are recorded for the operating system and applications loaded by the operating system, the above-described trusted platform 10 enables a user to check the state of the platform and decide whether or not to trust it. If the operating system has run an application that is not trusted by a first user (though possibly trusted by a different user), the first user can detect this (even after the application has terminated) by checking the relevant PCRs. However, in this case, for the above-described trusted platform, the only way for trust in the platform to be re-established for the first user is for the platform to be re-started. This drawback is multiplied where the platform is used to run a compartmented operating system supporting multiple computing environments since, unless appropriate measures are in place, running an un-trusted application in any of the environments requires the platform to be re-started to re-establish trust.

A solution to this is to provide a hardware/software architecture that enables the core software (BIOS & operating system/hypervisor) to be isolated from higher-level software so that if the latter is not trusted, it is only necessary to rebuild trust from the core software (assuming the latter is trusted). Where the core software supports multiple computing environments, then provided the latter are isolated from each other, an untrusted environment can be restarted without restarting the core software or the other computing environments supported by it. Furthermore, where multiple computing environments are supported, it is convenient to provide a respective trusted entity (typically a virtual trusted device) for each such environment.

An example trusted platform 80 supporting multiple isolated computing environments will now be briefly described with reference to FIG. 8. A fuller description of various forms of trusted platform of this type can be found in US published patent application US 2005/0223221, incorporated herein by reference.

Figure 8:
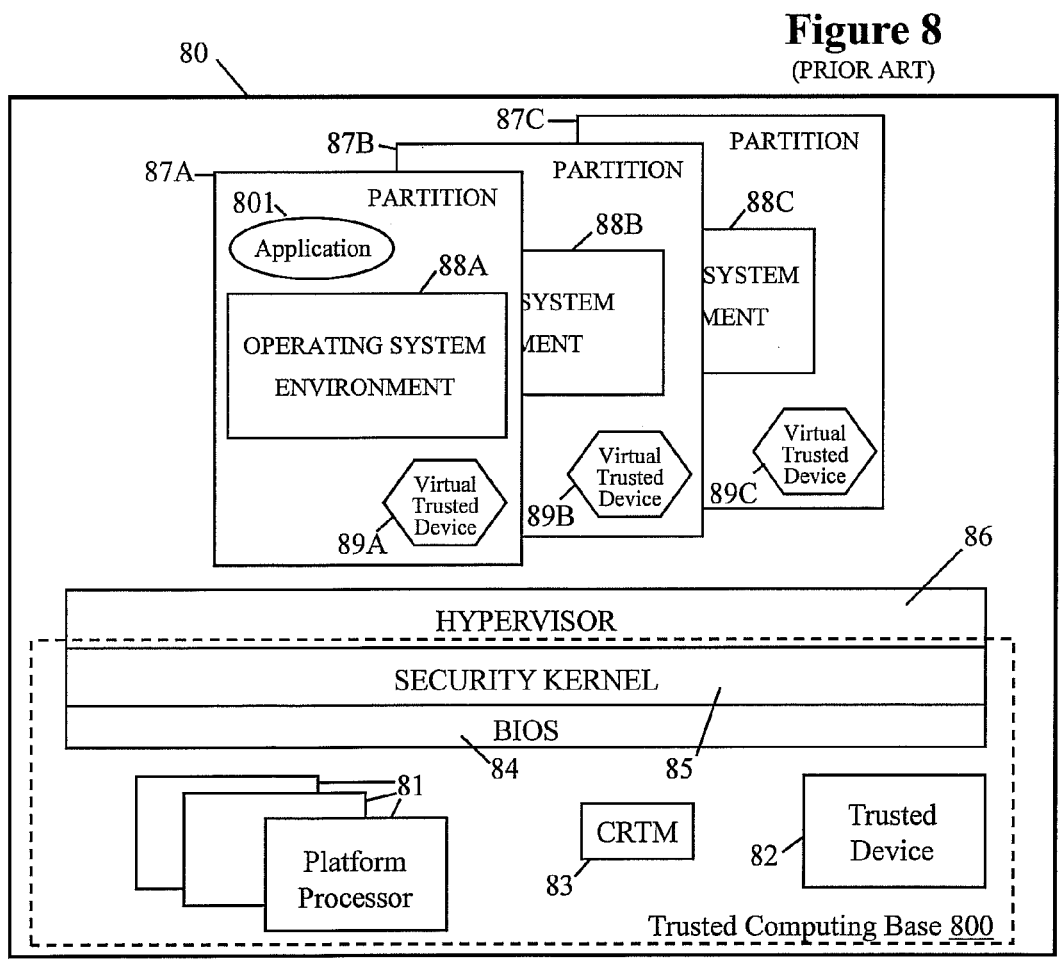
FIG. 8 is a diagram of a further prior-art computing platform running a hypervisor and providing for multiple isolated operating system environments.

The trusted platform 80 shown in FIG. 8 has one or more platform processors 81 and a hardware trusted device 82 similar to the previously described trusted device 24 but with the code forming the CRTM being in a separate ROM 83. In equivalent manner to that described above for the platform 10 and trusted device 24, following a platform reset, the CRTM code is run by one of the main platform processor 81 to determine an integrity metric for the BIOS code (stored for example in the same ROM 83 as the CRTM) and pass the metric to the trusted device 82 for insertion into a PCR. Thereafter, the BIOS is loaded 84 which in turn measures and records in trusted device 82 an integrity metric of security kernel code before loading the security kernel 85; the security kernel 85 then measures and records in trusted device 82 an integrity metric of hypervisor code before loading the hypervisor 86 (also called a virtual machine monitor). In practice, there will typically be more integrity metrics recorded and intermediate code modules loaded. The elements 81 to 85 form the trusted computing base 800 of the platform 80. The hypervisor 86 may also be considered part of the trusted computing base with the proviso that for any complex program such as hypervisor 86, while it is possible to verify that the hypervisor code on the platform is identical to a reference version, it is very difficult to be sure that the reference version itself does not possess any security weaknesses.

The hypervisor 86 enables a plurality of operating system environments to be provided each in its own partition isolated from the other operating system environments; in FIG. 8, by way of example, three operating system environments 88A, 88B and 88C are shown, each in its own respective partition 87A, 87B, 87C; each partition may be arranged to execute on a different platform processor 81, thereby improving the degree of isolation. The hypervisor 86 enables and protects communications between the partitions and with the outside world. Applications are run as required in an appropriate one of operating system environment; in the present case one application 801 is shown running in operating system environment 88A.

Additional/alternative guarantees of separation of the partitions can be provided by using a main platform processor that provides multiple privilege levels. In this case the BIOS 84 and the security kernel 85 are, for example, run at the most privileged level of the main platform processor 81 while the hypervisor 86 is run at the second most privileged level of the main platform processor 81. All other code is run at a lower privilege level (applications typically run at the lowest privilege level, below that of the operating system environments) thus providing isolation of the BIOS 84, the security kernel 85 and the hypervisor 86 from potentially untrustworthy code.

It will be appreciated that, in effect, each partition 87A, 87B, 87C provides a virtual computing platform environment, which is substantially independent of (e.g. encapsulated or compartmentalised) other such computing environments. To a user, such an environment appears to behave in exactly the same way as a standard, standalone computing platform, even down to the ability to re-boot the platform: where a re-boot operation of a virtual computing platform re-boots only the resources available in the relevant partition (in other words, a re-boot operation would not have any effect on other virtual computing platforms).

In the present example, each partition 87A, 87B, 87C has its own associated virtual trusted device 89A, 89B, 89C (although shown in FIG. 8 in each partition, the virtual trusted devices are logically part of the security kernel and, for a main processor with privilege levels, can be run at the same privilege level as the security kernel or in a separate partition). The hardware trusted device 82 is responsible for storing integrity metrics of the code for the virtual devices and related trust functionality (such as virtual RTM). Thereafter, the virtual trusted device 89 of a partition is responsible for recording and reporting integrity metrics for the related operating system environment and any applications it is running. Each virtual trusted device has its own AIK(s) for signing its integrity metric reports; such an AIK is issued by a credible entity (which could be the hardware trusted device 82) on the basis of the integrity measures reported by the device 82 for the trusted computing base and the virtual trusted device code. A full report of the integrity metrics relevant to an application in a given partition is a combination of:

the integrity metrics for the trusted computing base and virtual trusted device code, signed by the hardware trusted device; and the integrity metrics of the application and its operating system environment, signed by the relevant virtual trusted device.

It will be appreciated that the isolation provided by the platform 80, minimises the software that must be re-started to re-establish trust in any particular partition. It will also be appreciated that the arrangement of having one hardware trusted device 82 for the trusted computing base 800 and one virtual trusted device per partition is merely one possibility among many, including just having a single hardware or virtual trusted device for all the platform.

What is claimed is:

1. A method of operatively associating a signing key with a software component of a computing platform, the computing platform including a trusted device and being arranged on start-up to first load a predetermined set of software components with each software component being measured prior to loading and a corresponding integrity metric recorded in registers of the trusted device the method comprising:

generating a signing key and certificate evidence, comprising at least one certificate signed by a certificate authority, indicative that the signing key is operatively associated with a software component of said set;

storing a key-related item in secure persistent storage, the key-related item being one of said signing key and authorisation data for its use; and using the trusted device to enable a software component of said set, herein the "key-associated component" to obtain the key-related item this enabling only occurring during a particular period of at platform start-up when register values recorded in the registers of the trusted device correspond to values present after recording of the integrity metric of the key-associated component in the registers and before another integrity metric is recorded in the registers, wherein the key-associated component is o securely store integrity measures of software components loaded after said set of software components, the key-associated component providing reports of these integrity measures with these reports being signed using the signing key.

2. A method according to claim 1, wherein the key-related item is the signing key whereby the key-associated component is to directly use the signing key to sign data, the secure persistent storage being one of protected storage controlled by the trusted device, and an off-platform trusted entity.

3. A method according to claim 1, wherein the key-related item is authorisation data for using the signing key, and the secure persistent storage is one of protected storage controlled by the trusted device and an off-platform trusted entity;

the method further comprising storing the signing key in protected storage of the trusted device for use by the trusted device to sign data upon presentation to the trusted device of the authorisation data.

4. A method according to claim 1, wherein the key-related item is authorisation data for using the signing key and the secure persistent storage is protected storage controlled by the trusted device, the method further comprising storing the signing key in an off-platform trusted entity for use thereby to sign data only upon presentation to the off-platform trusted entity of the authorisation data.

5. A method according to claim 1, wherein:

the secure persistent storage is protected storage controlled by the trusted device; and using the trusted device to enable the key-associated component to obtain the key-related item from the secure persistent storage during said particular period, involves the trusted device releasing the key-related item from the protected storage to the key-associated component at a time when, during platform start-up, the register values correspond to values only present prior to loading of software components additional to those of said set.

6. A method according to claim 1, wherein:

the secure persistent storage is one of protected storage controlled by the trusted device and an off-platform trusted entity; and using the trusted device to enable the key-associated component to obtain the key-related item from the secure persistent storage during said particular period, involves the trusted device decrypting an encrypted form of the key-related item using a decryption key held in protected storage of the trusted device and only accessible for use when, during platform start-up, the register values correspond to values only present prior to loading of software components additional to those of said set.

7. A method according to claim 1, wherein the signing key is generated by one of the trusted device, the key-associated component and an off-platform trusted entity, and said certificate authority is one of the trusted device and an off-platform trusted entity.

8. A method according to claim 1, wherein:
the signing key is a non-migratable key generated by the trusted device,
the key-related item is authorisation data for using the signing key, and
the certificate evidence is a certificate of the signing key, this certificate being signed by the trusted device, acting as said certificate authority, using an Attestation Identity Key locked to register values only present prior to loading of software components additional to those of said set.

9. A method according to claim 1, wherein:
the signing key is one of a migratable key generated by the trusted device and a key generated by an off-platform trusted entity, and
the certificate evidence is a chain of certificates, signed by the trusted device acting as said certificate authority, and comprising:
a first certificate of a non-migratable key of the trusted device that is locked to register values only present prior to loading of software components additional to those of said set, the first certificate being signed using an Attestation Identity Key of the trusted device and
a second certificate of the signing key, the second certificate being signed using said non-migratable key.

10. A method according to claim 1, wherein the last to be loaded software component of said set of software components causes a change in the values in said registers prior to the loading of any further software component.

11. A method according to claim 1, wherein the key-associated component is the last to be loaded software component of said set of software components, and
wherein the key-associated component is to cause a change in the register values after obtaining the key-related item.

12. A method according to claim 1, wherein the trusted device is a trusted platform module substantially in compliance with a specification for modules of a Trusted Computing Group.

13. A method according to claim 1, wherein:
the trusted device is a trusted platform module substantially in compliance with a specification for modules of a Trusted Computing Group,
the signing key is one of a migratable key generated by the trusted device and a key generated by one of the key-associated component and an off-platform trusted entity, and
the certificate evidence comprises the trusted device output generated in response to a command for which the signing key is provided as an external input.

14. A system comprising a computing platform including a trusted device with registers for storing integrity metrics, the computer platform being arranged on start-up to first load a set of software components with each component being measured prior to loading and a corresponding integrity metric recorded in the trusted-device registers, the system including:
a key generator for generating a signing key;
a certificate authority for generating certificate evidence, comprising at least one certificate signed by the certificate authority, indicative that the signing key is operatively associated with a software component of said set; and
secure persistent storage for storing a key-related item, the key-related item being one of said signing key and authorisation data for its use;
wherein the trusted device is to enable a software component of said set, herein the "key-associated component", to obtain the key-related item, this enabling occurring only during a particular period of platform start-up when register values recorded in the registers correspond to values present after recording of the integrity metric of the key-associated component in the registers and before another integrity metric is recorded in the registers,
wherein the key-associated component s to securely store integrity measures of software components loaded after said set of software components, the key-associated component providing reports of these integrity measures with these reports being signed using the signing key.

15. A system according to claim 14, wherein the key-related item is the signing key whereby the key-associated component is to directly use the signing key to sign data, the secure persistent storage being one of protected storage controlled by the trusted device, and a trusted entity of the system distinct from the computing platform.

16. A system according to claim 14, wherein the key-related item is authorisation data for using the signing key, and the secure persistent storage is one of protected storage controlled by the trusted device and a trusted entity of the system distinct from the computing platform, and
wherein the trusted device is further to store the signing key in protected storage for use by the trusted device to sign data only upon presentation to the trusted device of the authorisation data.

17. A system according to claim 14, wherein the key-related item is authorisation data for using the signing key and the secure persistent storage is protected storage controlled by the trusted device, the system further comprising a trusted entity distinct from the computing platform to store the signing key and use the signing key to sign data only upon presentation to the trusted entity of the authorisation data.

18. A system according to clan 14, wherein the key generator is one of the trusted device, the key-associated component and a trusted entity of the system distinct from the computing platform, and said certificate authority is one of the trusted device and a trusted entity of the system distinct from the computing platform.

19. A system according to claim 14, wherein:
the key generator is the trusted device, wherein the trusted device is to generate the signing key as a non-migratable key,
the key-related item is authorisation data for using the signing key, and
the certificate authority is the trusted device to generate the certificate evidence as a certificate in respect of the signing key, signed using an Attestation Identity Key locked to register values only present prior to loading of software components additional to those of said set.

20. A system according to claim 14, wherein:
the key generator is one of the trusted device to generate the signing key as a migratable key, and a trusted entity of the system distinct from the computing platform, and the certificate authority is the trusted device to generate the certificate evidence as a chain of certificates comprising:
a first certificate of a non-migratable key of the trusted device that is locked to register values only present prior to loading of software components additional to those of said set, the first certificate being signed using an Attestation Identity Key of the trusted device; and
a second certificate of the signing key, the second certificate being signed using said non-migratable key.

21. A system according to claim 14, wherein the key-associated component is the last to be loaded software component of said set of software components, and wherein the key-associated component is to cause a change in the register values after obtaining the key-related item.

22. A system according to claim 14, wherein the trusted device is a trusted platform module substantially in compliance with a specification for modules of a Trusted Computing Group.

23. A method of operatively associating a signing key with a predetermined software component of a computing platform, the computing platform including a trusted device and being arranged on start-up to first load a set of software components with each component being measured prior to loading and a corresponding integrity metric recorded in registers of the trusted device, said predetermined component being the last to be loaded component of said set, the method comprising:

generating a signing key;

storing a key-related item in secure persistent storage, the key-related item being one of said signing key and authorisation data for its use; and using the trusted device to enable the predetermined component to obtain the key-related item, this enabling occurring only during a particular period of platform start-up when register values recorded in the registers of the trusted device correspond to values present immediately following recording of the integrity metric of the predetermined component and before another integrity metric is recorded in the registers; and changing the register values after the predetermined component has obtained the key-related item and prior to the loading of any further software component, wherein the predetermined component is to securely store integrity measures of software components loaded after said set of software components, the predetermined component providing reports of these integrity measures with these reports being signed using the signing key.

* * * * *